(12) United States Patent
Pursifull et al.

(10) Patent No.: US 9,328,702 B2
(45) Date of Patent: May 3, 2016

(54) MULTIPLE TAP ASPIRATOR

(71) Applicant: Ford Global Technologies, LLC, Dearborn, MI (US)

(72) Inventors: Ross Dykstra Pursifull, Dearborn, MI (US); Brad Alan VanDerWege, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 14/062,323

(22) Filed: Oct. 24, 2013

(65) Prior Publication Data

US 2015/0114348 A1 Apr. 30, 2015

(51) Int. Cl.
| | |
|---|---|
| B60K 25/04 | (2006.01) |
| F02M 35/10 | (2006.01) |
| B60T 17/02 | (2006.01) |
| F01M 13/02 | (2006.01) |
| F01M 13/04 | (2006.01) |
| F02M 25/08 | (2006.01) |
| F02M 35/12 | (2006.01) |
| F04F 5/14 | (2006.01) |
| F04F 5/52 | (2006.01) |

(52) U.S. Cl.
CPC .......... *F02M 35/10229* (2013.01); *B60K 25/04* (2013.01); *B60T 17/02* (2013.01); *F01M 13/02* (2013.01); *F01M 13/04* (2013.01); *F02M 25/08* (2013.01); *F02M 35/10* (2013.01); *F02M 35/1272* (2013.01); *F04F 5/14* (2013.01); *F04F 5/52* (2013.01); *F02M 25/089* (2013.01); *F02M 35/10118* (2013.01); *F02M 35/10222* (2013.01); *F02M 35/10275* (2013.01); *F02M 35/1294* (2013.01)

(58) Field of Classification Search
CPC . F02M 35/10229; F02M 25/08; B60K 25/04; B60T 17/02; F01M 13/02
See application file for complete search history.

(56) References Cited

U.S. PATENT DOCUMENTS

| | | | |
|---|---|---|---|
| 5,228,839 A | 7/1993 | Peterson et al. | |
| 5,584,668 A | 12/1996 | Volkmann | |
| 5,683,227 A | 11/1997 | Nagai et al. | |
| 6,227,177 B1 * | 5/2001 | Yamafuji et al. | 123/520 |
| 6,394,760 B1 | 5/2002 | Tell | |
| 6,582,199 B1 | 6/2003 | Volkmann | |

(Continued)

OTHER PUBLICATIONS

"Gast Vacuum Generators," Gast Manufacturing, Inc., E2-10, Jul. 2012 Catalog, Benton Harbor, MI, 21 pages.

(Continued)

*Primary Examiner* — Stephen K Cronin
*Assistant Examiner* — Jacob Amick
(74) *Attorney, Agent, or Firm* — Julia Voutyras; Alleman Hall McCoy Russell & Tuttle LLP

(57) ABSTRACT

Systems and methods are provided for engine systems including a vacuum-powered multiple tap aspirator coupled between atmospheric, an engine crankcase, or another source and a vacuum source such as a compressor inlet or engine intake manifold. The multiple tap aspirator includes a suction tap arranged in a throat of the aspirator, a suction tap arranged in a diverging cone of the aspirator, and a suction tap arranged in a straight exit tube downstream of the diverging cone of the aspirator. The aspirator provides vacuum generation and suction flow over a range of vacuum levels at the suction taps, and suction flow only passes through a single check valve before entering the aspirator.

19 Claims, 11 Drawing Sheets

(56) References Cited

U.S. PATENT DOCUMENTS

| | | |
|---|---|---|
| 8,231,358 B2 | 7/2012 | Cho |
| 2006/0016477 A1* | 1/2006 | Zaparackas .................. 137/112 |
| 2011/0123359 A1 | 5/2011 | Schaaf |
| 2011/0132311 A1* | 6/2011 | Pursifull et al. ......... 123/184.56 |

OTHER PUBLICATIONS

Anonymous, "A Combined Aspirator With an Integrated Dual Check Valve Assembly," IPCOM No. 000239163, Published Oct. 17, 2014, 2 pages.

* cited by examiner

MULTIPLE TAP ASPIRATOR

FIELD

The present invention relates to a vacuum-powered aspirator with multiple taps which may be included in an engine system.

BACKGROUND AND SUMMARY

Vehicle engine systems may include various vacuum consumption devices that are actuated using vacuum. These may include, for example, a brake booster. Vacuum used by these devices may be provided by a dedicated vacuum pump, such as an electrically-driven or engine-driven vacuum pump. As an alternative to such resource-consuming vacuum pumps, one or more aspirators may be coupled in an engine system to harness engine airflow for generation of vacuum. Aspirators (which may alternatively be referred to as ejectors, venturi pumps, jet pumps, and eductors) are passive devices which provide low-cost vacuum generation when utilized in engine systems. An amount of vacuum generated at an aspirator can be controlled by controlling the motive air flow rate through the aspirator. For example, when incorporated in an engine intake system, aspirators may generate vacuum using energy that would otherwise be lost to throttling, and the generated vacuum may be used in vacuum-powered devices such as brake boosters.

Typically, aspirators are designed to maximize either vacuum generation or suction flow, but not both. Staged aspirators including multiple suction ports or taps may be used, but such aspirators tend to suffer from various disadvantages. For example, staged aspirators may rely on a motive flow of compressed air, and may not be usable in configurations where motive flow is intermittent (e.g., intermittent motive flow may result in vacuum reservoir vacuum loss in some examples). Further, staged aspirators may be configured such that suction flow must pass through multiple check valves en route to the suction port(s) of the aspirator, which may disadvantageously result in flow losses.

To address at least some of these issues, the inventors herein have identified a multiple tap aspirator which, when incorporated in an engine system, provides both high vacuum generation and high suction flow, and may be operated with a low pressure difference driving motive flow, during intermittent motive flow conditions. In one example, an engine system includes an aspirator with a suction tap in a throat of the aspirator, a suction tap in a diverging cone of the aspirator, and a suction tap in a straight tube downstream of the diverging cone. The inventors have recognized that placement of suction taps in the throat, diverging cone, and straight exit tube of the aspirator advantageously maximizes vacuum generation while enabling a high suction flow rate, in that this placement combines the advantages of throat tap aspirators (e.g., high vacuum generation) with the advantages of aspirators with taps arranged downstream of the throat (e.g., high suction flow). Inclusion of a tap in the exit tube (e.g., a straight, unconstricted tube downstream of the aspirator's diverging cone) advantageously enables fast pull-down of a vacuum source, such as a brake booster. Further, the inventors have recognized that such an aspirator may be powered by vacuum rather than compressed air. For example, a motive inlet of the aspirator may be coupled with atmosphere, and a mixed flow outlet of the aspirator coupled with a vacuum source, such that the pressure differential between atmosphere and the vacuum source induces flow through the aspirator. In other examples, the multiple tap aspirator may be coupled between an engine crankcase and a low pressure sink of the engine intake system such as the compressor inlet or intake manifold, so as to generate vacuum via crankcase ventilation flow. Furthermore, by including only a single check valve in the path between the source of suction flow and each suction tap of the aspirator, flow losses which often occur in staged aspirators featuring multiple check valves in the suction flow path may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Depending on where it is coupled in an engine system, a multiple tap aspirator may generate vacuum over a range of engine operating conditions via a motive flow from the intake passage (as in the engine systems of FIGS. 1 and 3) or the crankcase (as in the engine systems of FIGS. 5 and 6), among other possible motive flow sources. The multiple tap aspirator may be vacuum-powered; that is, a pressure differential between the motive inlet and mixed flow outlet of the aspirator may induce flow through the aspirator, and therefore the motive flow source of the aspirator may have a low gauge pressure (e.g., atmospheric pressure). Detail views of example multiple tap aspirators are provided in FIGS. 2 and 4; as shown, the different suction taps of the aspirator may be coupled to the same source or to different sources. Due to the placement of check valves in respective suction passages coupled to each tap of the aspirator, intermittent motive flow through the aspirator may be permitted. Further, the check valves may be arranged such that suction flow only passes through a single check valve, thereby minimizing flow losses that may occur in staged aspirator arrangements featuring multiple check valves. As shown in FIG. 7, in examples where all of the taps are coupled to a same vacuum reservoir, suction flow from the vacuum reservoir may enter one or more of the taps depending on a pressure differential between the vacuum reservoir and mixed flow outlet of the aspirator (e.g., the intake manifold). In accordance with the methods of FIGS. 8, 9A-D, and 10, flow through the aspirator may be controlled by controlling an ASOV arranged in series with the aspirator, and further by adjusting the pressure at the sink of the aspirator via adjustment of an AIS throttle in some examples. Accordingly, a desired flow (and thus a desired amount of vacuum generation/fuel vapor purge/crankcase ventilation) may be achieved via the multiple tap aspirator. Further, the composition and amount of flow entering the engine for combustion from the aspirator's mixed flow outlet may be measured and/or estimated, such that engine air-fuel ratio may be compensated as needed (e.g., if motive or suction flow from the aspirator includes fuel vapors).

Figure 1:
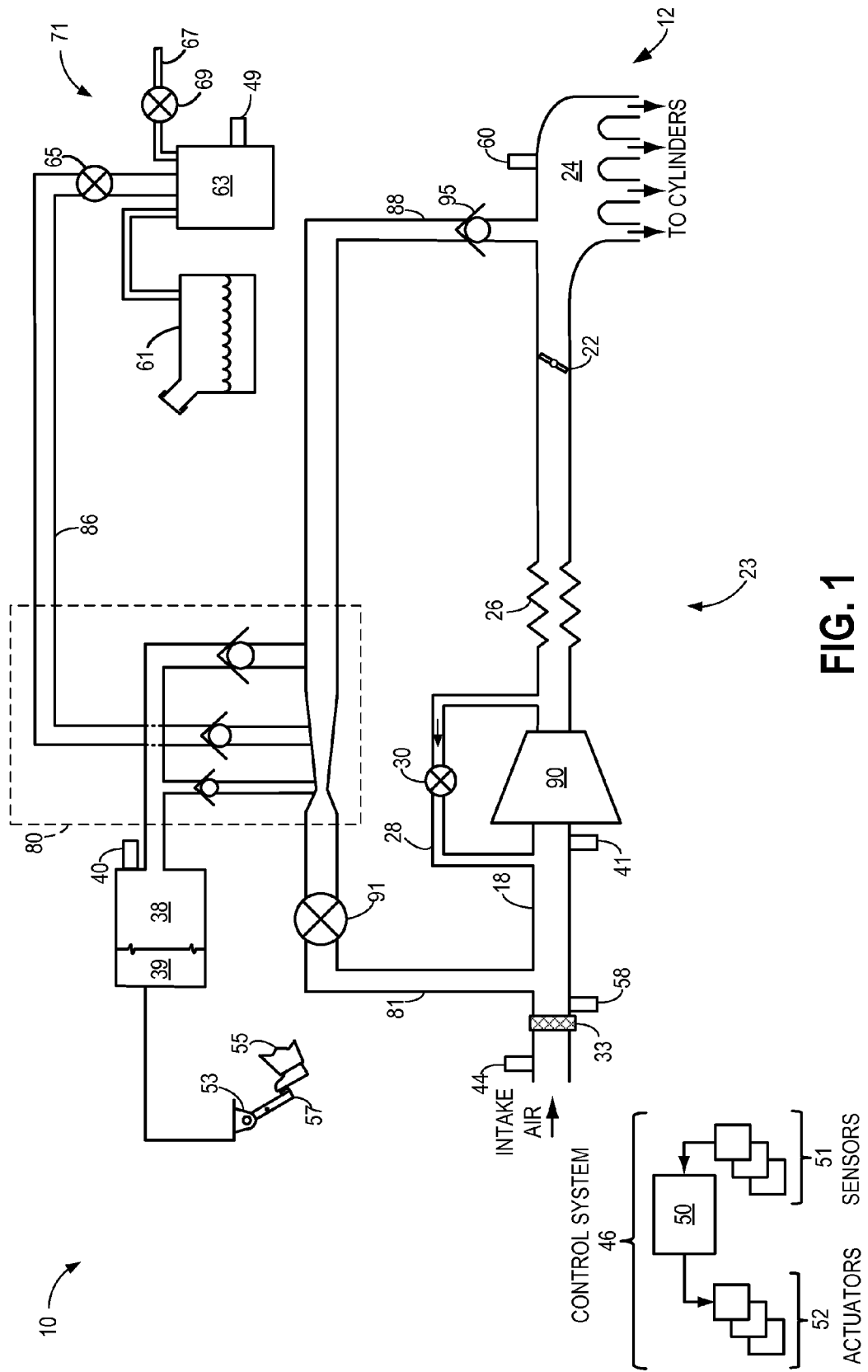
FIG. 1 shows a schematic diagram of a first embodiment of an engine system including a multiple tap aspirator.

Turning to FIG. 1, it shows an example engine system 10 including an engine 12. In the present example, engine 12 is a spark-ignition engine of a vehicle, the engine including a plurality of cylinders (not shown). Combustion events in each cylinder drive a piston which in turn rotates a crankshaft, as is well known to those of skill in the art. Further, engine 12 may include a plurality of engine valves for controlling the intake and exhaust of gases in the plurality of cylinders.

Engine 12 includes a control system 46. Control system 46 includes a controller 50, which may be any electronic control system of the engine system or of the vehicle in which the engine system is installed. Controller 50 may be configured to make control decisions based at least partly on input from one or more sensors 51 within the engine system, and may control actuators 52 based on the control decisions. For example, controller 50 may store computer-readable instructions in memory, and actuators 52 may be controlled via execution of the instructions.

Engine 12 has an engine intake system 23 that includes an air intake throttle 22 fluidly coupled to an engine intake manifold 24 along an intake passage 18. Air may enter intake passage 18 from an air intake system including an air cleaner 33 in communication with the vehicle's environment. A position of throttle 22 may be varied by controller 50 via a signal provided to an electric motor or actuator included with the throttle 22, a configuration that is commonly referred to as electronic throttle control. In this manner, the throttle 22 may be operated to vary the intake air provided to the intake manifold and the plurality of engine cylinders.

A barometric pressure (BP) sensor 44 may be coupled at an inlet of intake passage 18, e.g. upstream of the air filter, for providing a signal regarding barometric (e.g., atmospheric) pressure to controller 50. Additionally, a mass air flow (MAF) sensor 58 may be coupled in intake passage 18 just downstream of air cleaner 33 for providing a signal regarding mass air flow in the intake passage to controller 50. In other examples, MAF sensor 58 may be coupled elsewhere in the intake system or engine system, and further, there may be one or more additional MAF sensors arranged in the intake system or engine system. Further, a sensor 60 may be coupled to intake manifold 24 for providing a signal regarding manifold air pressure (MAP) and/or manifold vacuum (MANVAC) to controller 50. For example, sensor 60 may be a pressure sensor or a gauge sensor reading vacuum, and may transmit data as negative vacuum (e.g., pressure) to controller 50. In some examples, additional pressure/vacuum sensors may be coupled elsewhere in the engine system to provide signals regarding pressure/vacuum in other areas of the engine system to controller 50.

Engine system 10 may be a boosted engine system, where the engine system further includes a boosting device. In the present example, intake passage 18 includes a compressor 90 for boosting an intake air charge received along intake passage 18. A charge air cooler (or intercooler) 26 is coupled downstream of compressor 90 for cooling the boosted air charge before delivery to the intake manifold. In embodiments where the boosting device is a turbocharger, compressor 90 may be coupled to and driven by an exhaust turbine (not shown). Further compressor 90 may be, at least in part, driven by an electric motor or the engine crankshaft.

An optional bypass passage 28 may be coupled across compressor 90 so as to divert at least a portion of intake air compressed by compressor 90 back upstream of the compressor. An amount of air diverted through bypass passage 28 may be controlled by opening compressor bypass valve (CBV) 30 located in bypass passage 28. By controlling CBV 30, and varying an amount of air diverted through the bypass passage 28, a boost pressure provided downstream of the compressor can be regulated. This configuration enables boost control and surge control.

In the embodiment of FIG. 1, a compressor inlet pressure (CIP) sensor 41 is arranged downstream a junction of intake passage 18 and bypass passage 28, and upstream of the compressor. CIP sensor 41 may provide a signal regarding CIP to controller 50.

Engine system 10 further includes fuel tank 61, which stores a volatile liquid fuel combusted in engine 12. To avoid emission of fuel vapors from the fuel tank and into the atmosphere, the fuel tank is vented to the atmosphere through adsorbent canister 63. The adsorbent canister may have a significant capacity for storing hydrocarbon-, alcohol-, and/or ester-based fuels in an adsorbed state; it may be filled with activated carbon granules and/or another high surface-area material, for example. Nevertheless, prolonged adsorption of fuel vapor will eventually reduce the capacity of the adsorbent canister for further storage. Therefore, the adsorbent canister may be periodically purged of adsorbed fuel, as further described hereinafter. In the configuration shown in FIG. 1, canister purge valve 65 controls the purging of fuel vapors from the canister into the intake manifold along a suction passage 84 coupled to a suction tap arranged at an exit tube of a multiple tap aspirator, as will be described below.

When purging conditions are met, such as when the canister is saturated, vapors stored in fuel vapor canister 63 may be purged to intake manifold 24 by opening canister purge valve 65. While a single canister 63 is shown, it will be appreciated that any number of canisters may be coupled in engine system 10. In one example, canister purge valve 65 may be a solenoid valve wherein opening or closing of the valve is performed via actuation of a canister purge solenoid. Canister 63 further includes a vent 67 for routing gases out of the canister 63 to the atmosphere when storing, or trapping, fuel vapors from fuel tank 26. Vent 67 may also allow fresh air to be drawn into fuel vapor canister 63 when purging stored fuel vapors to intake manifold 24 via passage 84. While this example shows vent 67 communicating with fresh, unheated air, various modifications may also be used. Vent 67 may include a canister vent valve 69 to adjust a flow of air and vapors between canister 63 and the atmosphere. As shown, a pressure sensor 49 may be arranged in canister 63 and may provide a signal regarding the pressure in the canister to controller 50. In other examples, pressure sensor 49 may be arranged elsewhere, for example in passage 84.

Engine system 10 further includes a multiple tap aspirator 80. Aspirator 80 may be an ejector, aspirator, eductor, venturi, jet pump, or similar passive device. As shown in the detail view of aspirator 80 in FIG. 2, aspirator 80 includes at least five ports: a motive inlet 45, a mixed flow outlet 47, and at least three suction taps for vacuum generation. In the depicted embodiment, exactly three suction taps are shown: a tap at a throat 77 of the aspirator ("throat tap") 83, a tap in a diverging cone of the aspirator ("diverging cone tap") 85, and a tap in an exit tube of the aspirator ("exit tube tap") 87. As described further below, motive flow through the aspirator generates a suction flow at one or more of the suction taps depending on vacuum levels at one or more suction flow sources and the intake manifold, thereby generating vacuum, e.g. which may be stored in a vacuum reservoir and/or directly provided to various vacuum consumers of the engine system.

Figure 2:
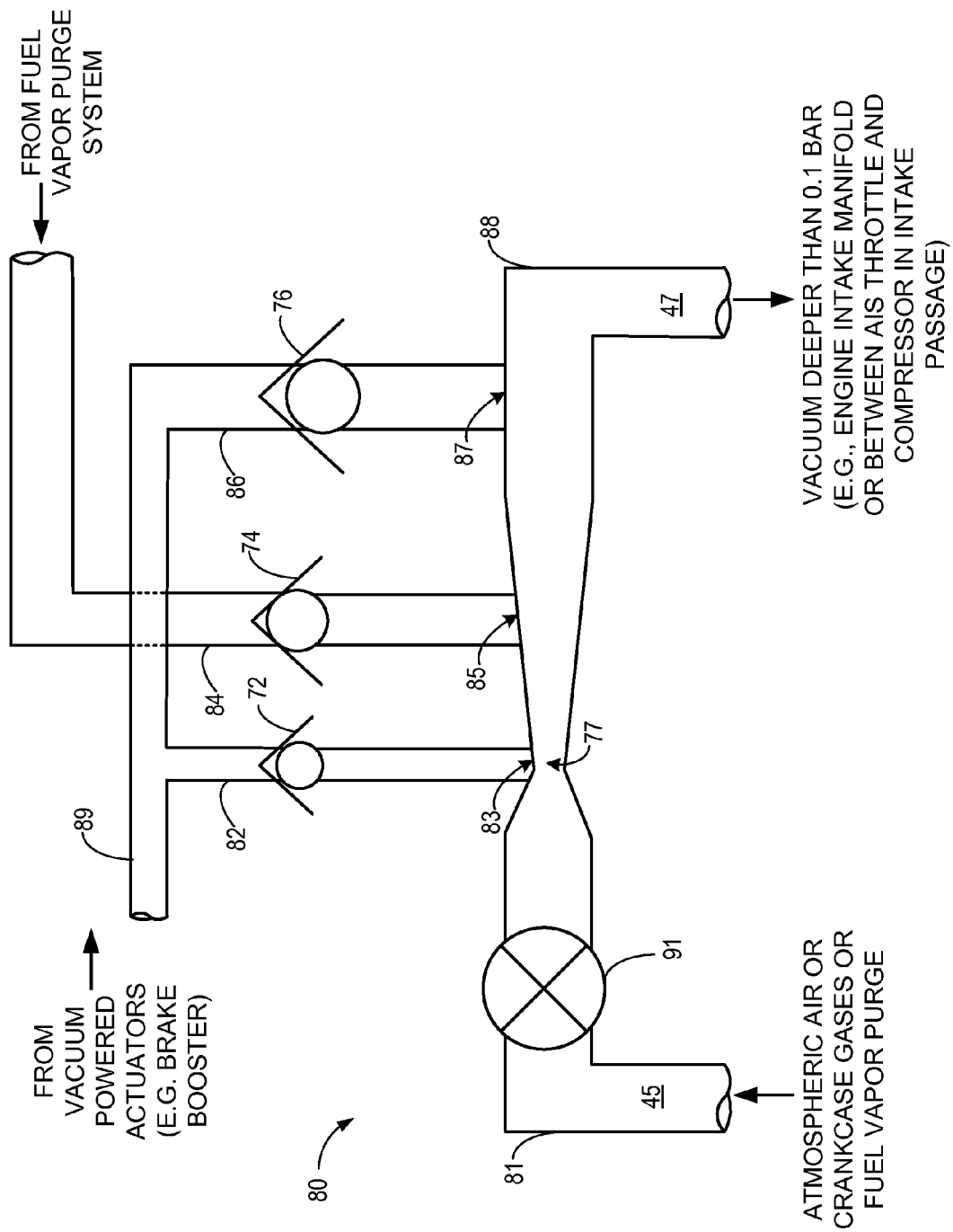
FIG. 2 shows a detail view of a multiple tap aspirator which may be included in an engine system such as the engine system of FIG. 1.

In the example embodiment depicted in FIG. 2, a passage 81 couples motive inlet 45 of aspirator 80 with intake passage 18 near an inlet of the intake passage, downstream of air filter 33. In other examples, passage 81 may couple the motive inlet of aspirator 80 with the intake passage at another portion, or alternatively, passage 81 may lead directly to atmosphere instead of being coupled to the intake passage. Further, in the depicted embodiment, a passage 88 couples mixed flow outlet 47 of aspirator 80 with intake manifold 24. However, in other embodiments, passage 88 may couple the mixed flow outlet of aspirator 80 with another portion of the engine system which has a vacuum level deeper than 0.1 bar.

In the depicted example, a check valve 95 arranged in passage 88 prevents backflow from the intake manifold to the intake passage via aspirator 80, which may for example otherwise occur during boost when MAP is greater than BP. However, it will be appreciated that in other examples, check valve 95 may be omitted, as reverse flow through the aspirator may be desirable in that it may generate vacuum (albeit less vacuum than is generated through forward flow through the aspirator). In still further examples, aspirator 80 may be designed with a flow geometry that maximizes vacuum generation for bidirectional flow, and thus it may not be desirable to restrict reverse flow using a check valve such as check valve 95.

Each suction tap of the aspirator has a corresponding passage. As shown in FIG. 2, a suction passage 82 couples tap 83 of aspirator 80 with common passage 89, a suction passage 84 couples tap 85 with the fuel vapor purge system, and a suction passage 86 couples tap 87 with common passage 89, such that suction passages 82 and 86 effectively merge to form common passage 89. In the depicted example, the suction passages have different dimensions; that is, suction passage 82 is smaller than suction passage 84, and suction passage 84 is smaller than suction passage 86. As detailed below, such an arrangement may be appropriate as the amount of peak suction flow occurring through suction passage 82 may be smaller than the amount of suction flow occurring through suction passage 84, which may in turn be smaller than the amount of suction flow occurring through passage 86.

In the embodiment of FIGS. 1-2, no check valves are arranged in common passage 89. Instead, a check valve is arranged in each of suction passages 82 and 86 upstream of a juncture of these passages with common passage 89. Specifically, a check valve 72 is arranged in suction passage 82, and a check valve 76 is arranged in suction passage 86. Further, a check valve 74 is arranged in suction passage 84. While the depicted embodiment shows the check valves as distinct valves, in alternate embodiments, each check valve may be integrated into the aspirator, for example proximal to the corresponding suction tap. Whereas known multiple tap aspirators may require suction flow to pass through multiple check valves (e.g., multiple check valves arranged in series or arranged in a common passage between the junctures of suction passages with the common passage), the depicted arrangement advantageously requires suction flow to pass through only a single check valve as it travels from a source of suction flow to the aspirator via one of the suction passages, thereby reducing flow losses which may result from flow through multiple check valves. The check valve arranged in each suction passage prevents backflow from aspirator 80 to the source of suction flow, thereby allowing vacuum reservoir 38 to retain its vacuum should the pressures at the motive inlet of aspirator 80 and the vacuum reservoir equalize. Because mixed flow outlet 47 of aspirator 80 communicates with intake manifold 24 in the embodiment of FIGS. 1-2, check valves 72, 74, and 76 prevent reverse flow from the intake manifold, e.g. which might otherwise occur during conditions when intake manifold pressure is higher than pressure at the suction flow source(s). Similarly, check valves 72, 74, and 76 help to prevent fluid such as an intake air charge from flowing from passage 81 into the suction flow source(s).

As may be seen in FIG. 1, suction taps 83 and 87 of aspirator 80 communicate with a vacuum reservoir 38 by way of common passage 89. Vacuum reservoir 38 may provide vacuum to one or more vacuum actuators 39 of the engine system. In one non-limiting example, vacuum actuators 39 may include a brake booster coupled to vehicle wheel brakes wherein vacuum reservoir 38 is a vacuum cavity in front of a diaphragm of the brake booster, as shown in FIG. 1. In such an example, vacuum reservoir 38 may be an internal vacuum reservoir configured to amplify a force provided by a vehicle operator 55 via a brake pedal 57 for applying vehicle wheel brakes (not shown). A position of the brake pedal 57 may be monitored by a brake pedal sensor 53. In alternate embodiments, the vacuum reservoir may be a low pressure storage tank included in a fuel vapor purge system, a vacuum reservoir coupled to a turbine wastegate, a vacuum reservoir coupled to a charge motion control valve, etc. In such embodiments, vacuum consumption devices 39 of the vehicle system may include various vacuum-actuated valves such as charge motion control valves, a 4×4 hub lock, switchable engine mounts, heating, ventilation and cooling, vacuum leak checks, crankcase ventilation, exhaust gas recirculation, gaseous fuel systems, compressor bypass valves (e.g., CBV 30 shown in FIG. 1), wheel-to-axle disconnect, etc. In one example embodiment, anticipated vacuum consumption by the vacuum consumers during various engine operating conditions may be stored in a lookup table in memory of the control system, for example, and the stored vacuum threshold corresponding to anticipated vacuum consumption for current engine operating conditions may be determined by referencing the lookup table. In some embodiments, as depicted, a sensor 40 may be coupled to the vacuum reservoir 38 for providing an estimate of the vacuum level at the reservoir. Sensor 40 may be a gauge sensor reading vacuum, and may transmit data as negative vacuum (e.g., pressure) to controller

50. Accordingly, sensor 40 may measure the amount of vacuum stored in vacuum reservoir 38.

Due to the converging-diverging shape of aspirator 80, the flow of atmospheric air from motive inlet 45 to mixed flow outlet 47 of aspirator 80 may generate a low pressure at one or more of suction taps 83 and 85 of the aspirator, depending on relative vacuum levels in the vacuum reservoir and at the mixed flow outlet of aspirator 80 (e.g., in the intake manifold) and depending on relative vacuum levels in the fuel vapor purge system and at the mixed flow outlet of aspirator 80. This low pressure may induce a suction flow from common passage 89 into one or more of suction taps 83 and 87, thereby generating vacuum at vacuum reservoir 38, and may induce a suction flow from the fuel vapor purge system into tap 85 so as to purge the fuel vapor canister. Because suction tap 83 is arranged at throat 77 of aspirator 80, which is the portion of the aspirator with the smallest cross-sectional flow area, the venturi effect is strongest at suction tap 83 and thus more vacuum may be generated at suction tap 83 as compared to suction tap 85, which is arranged in the diverging cone of aspirator 80 and therefore is arranged at a portion of the aspirator with a larger cross-sectional flow area. However, a smaller suction flow (e.g., flow rate or level) may occur via suction tap 83, whereas a larger suction flow may occur via suction tap 85.

In contrast to suction taps 83 and 85, suction tap 87 is positioned in the exit tube of aspirator 80, which may be a straight tube as shown. Accordingly, full pressure recovery of the motive fluid flowing through the aspirator occurs before the fluid passes suction tap 87. In the embodiment of FIGS. 1-2, suction passage 86 couples suction tap 87 to the vacuum reservoir as noted above. While suction flow does not contribute to vacuum generation, it advantageously provides a direct path for a high volume of flow from the fuel vapor purge system to the intake manifold.

It will be appreciated that the inclusion of multiple taps in aspirator 80 enables the aspirator to achieve the different advantages associated with placing a suction tap at different parts of the aspirator. For example, deep vacuum but small flow may be achieved via the throat tap, shallow vacuum but high flow may be achieved via the diverging cone tap, and no vacuum enhancement but very high flow may be achieved via the exit tube tap. Further, in contrast to known multiple tap aspirators such as Gast vacuum generators which must be coupled between a high pressure source and a low pressure sink (e.g., between a compressed air source at 5 bar and atmosphere at 0 bar), aspirator 80 may be coupled between a source with a pressure at or near atmospheric pressure and a lower pressure source (e.g., it may receive atmospheric air at its motive inlet and deliver mixed flow to a sink with vacuum deeper than 0.1 bar such as the intake manifold).

In some examples, aspirator 80 may operate passively, e.g., whether motive flow passes through aspirator 80 may depend upon pressures within engine system 10 and other engine operating parameters without any active control performed by the control system. However, in the embodiment of FIGS. 1-2, an aspirator shut-off valve (ASOV) 91 is actively controlled to allow/disallow motive flow through the aspirator (in the case of a binary ASOV) or to reduce/increase flow through the aspirator (in the case of a continuously variable ASOV). As shown, ASOV 91 is arranged in passage 81 upstream of throat 77 of aspirator 80; in other embodiments, the ASOV may be arranged downstream of the throat of the aspirator (e.g., in the exit tube or downstream of the exit tube), or the ASOVs may be integral to the aspirator (e.g., the valve may be arranged at the throat of the aspirators). One advantage of positioning the ASOV upstream of the aspirator is that when the ASOV is upstream, the pressure loss associated with the ASOV has less of an impact as compared to configurations where the ASOV is downstream of the aspirator or where the ASOV is integral to the aspirator.

ASOV 91 may be a solenoid valve which is actuated electrically, and its state may be controlled by controller 50 based on various engine operating conditions. However, as an alternative, the ASOV may be a pneumatic (e.g., vacuum-actuated) valve; in this case, the actuating vacuum for the valve may be sourced from the intake manifold and/or vacuum reservoir and/or other low pressure sinks of the engine system. In embodiments where the ASOV is a pneumatically-controlled valve, control of the ASOV may be performed independent of a powertrain control module (e.g., the ASOV may be passively controlled based on pressure/vacuum levels within the engine system).

Whether it is actuated electrically or with vacuum, ASOV 91 may be either a binary valve (e.g. two-way valve) or a continuously variable valve. Binary valves may be controlled either fully open or fully closed (shut), such that a fully open position of a binary valve is a position in which the valve exerts no flow restriction, and a fully closed position of a binary valve is a position in which the valve restricts all flow such that no flow may pass through the valve. In contrast, continuously variable valves may be partially opened to varying degrees. Embodiments with a continuously variable ASOV may provide greater flexibility in control of the motive flow through the aspirator, with the drawback that continuously variable valves may be much more costly than binary valves.

In other examples, ASOV 91 may be a gate valve, pivoting plate valve, poppet valve, or another suitable type of valve.

Figure 3:
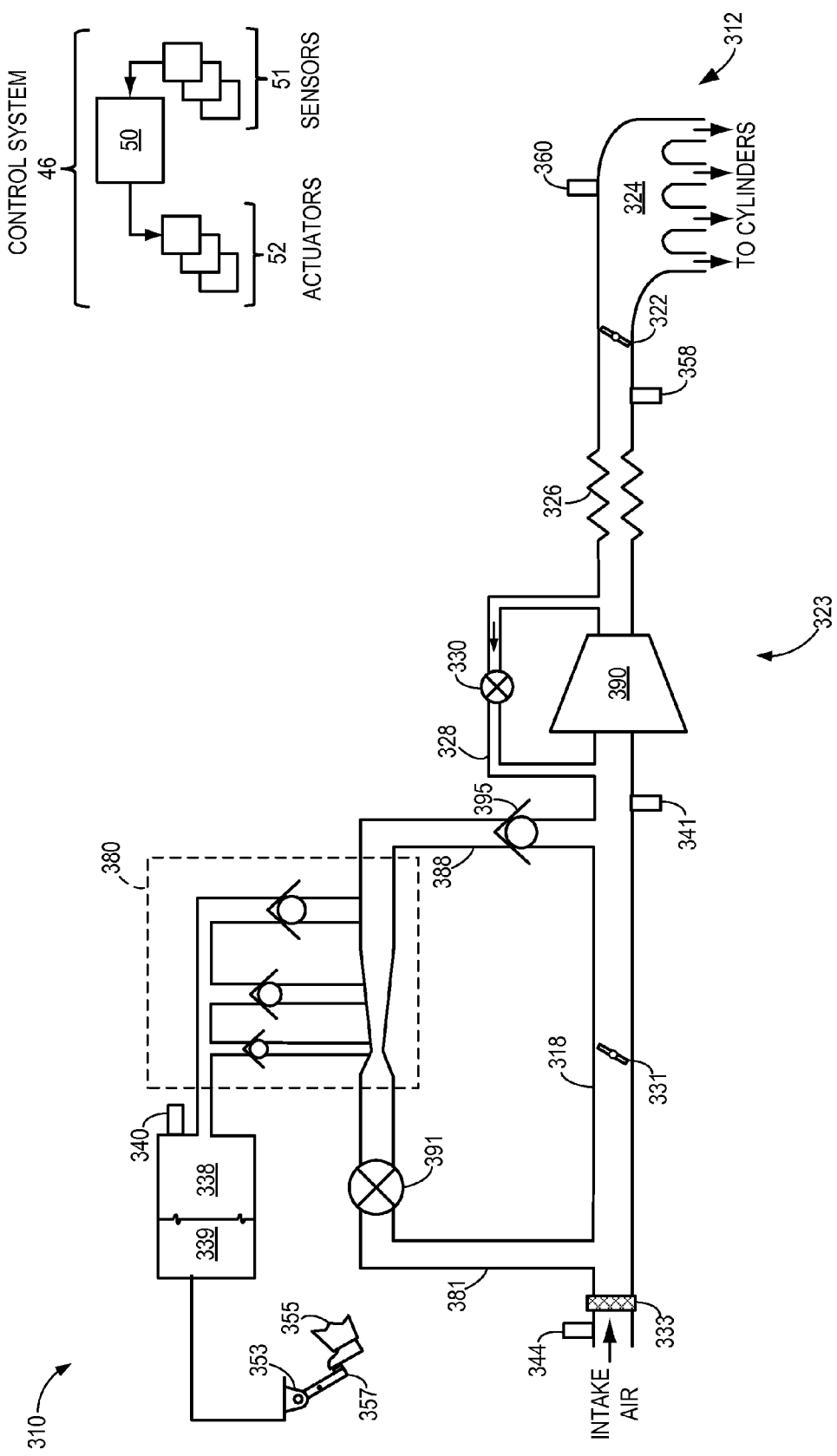
FIG. 3 shows a schematic diagram of a second embodiment of an engine system including a multiple tap aspirator.
Figure 4:
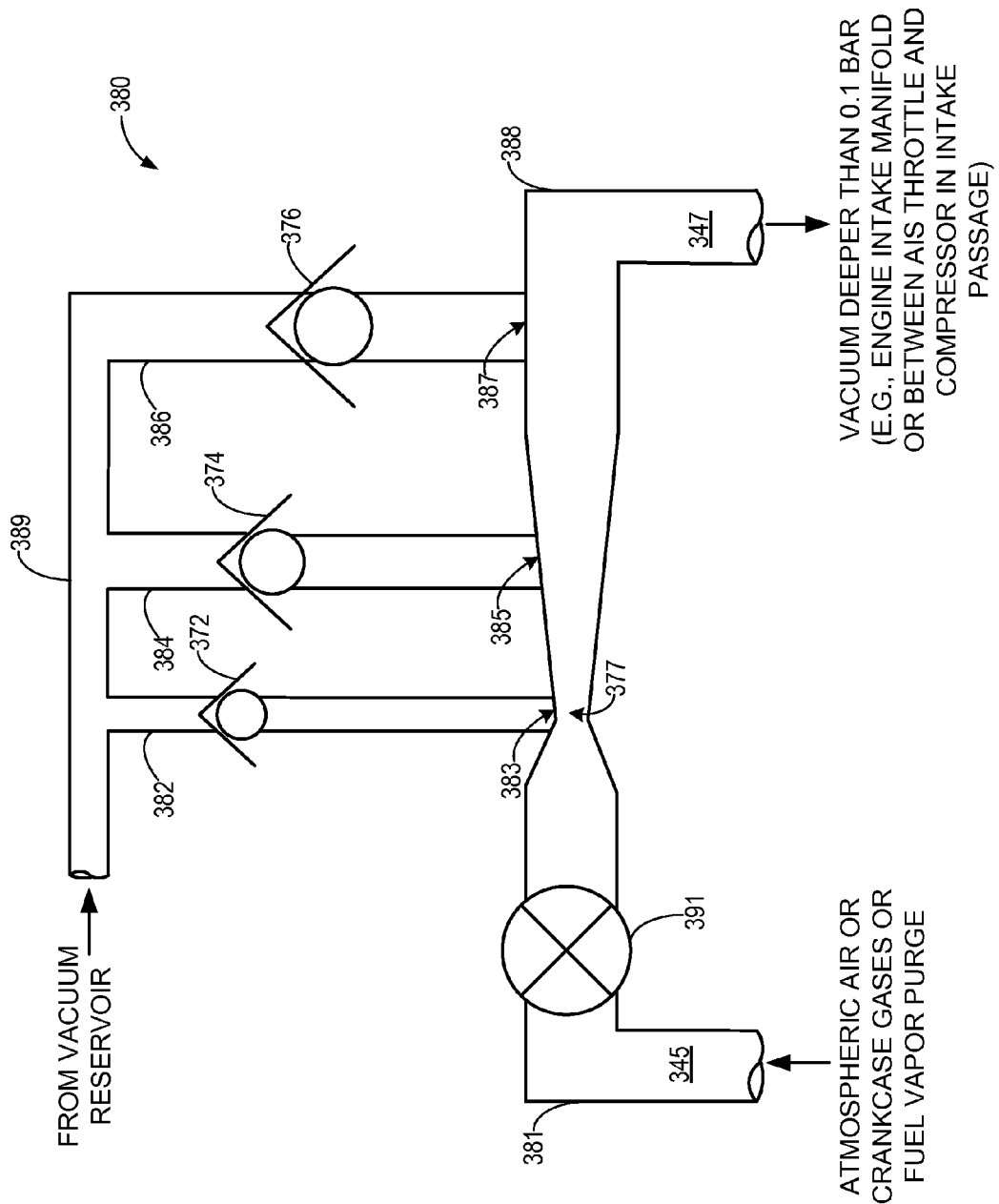
FIG. 4 shows a detail view of a multiple tap aspirator which may be included in an engine system such as the engine system of FIG. 3.

A second embodiment of an engine system including a multiple tap aspirator is depicted in FIGS. 3-4. The second embodiment includes many of the same features described above for the first embodiment; similar features are numbered similarly and will not be described again for the sake of brevity. Further, it will be appreciated that various features among the two embodiments are usable together. For example, the multiple tap aspirator and suction passages of FIG. 3 may be configured in accordance with FIG. 2 rather than FIG. 4, or the multiple tap aspirator and suction passages of FIG. 1 may be configured in accordance with FIG. 4 rather than FIG. 2, without departing from the scope of this disclosure.

One difference between the first embodiment and the second embodiment is that in the second embodiment, an air induction system (AIS) throttle 331 is included in the intake passage upstream of compressor 390, and mixed flow outlet 347 of aspirator 80 is coupled to intake passage 318 downstream of AIS throttle 331 and upstream of compressor 390. Specifically, whereas in the first embodiment, passage 88 is coupled to the intake manifold, passage 388 of FIG. 3 is coupled to the intake passage intermediate the AIS throttle and the compressor. A position of AIS throttle 331 may be varied by controller 50 via a signal provided to an electric motor or actuator included with the AIS throttle 331. In this manner, AIS throttle 331 may be operated to vary the pressure in the intake passage at the compressor inlet, which in turn may vary a flow rate of compressor recirculation flow in bypass passage 328. Similarly, when AIS throttle 331 is operated to vary the pressure in the intake passage at the compressor inlet, this may vary motive flow through aspirator 380. For example, increasing closing of AIS throttle 331 may cause reduction in pressure (e.g., increased vacuum) in a region of the intake passage intermediate the AIS throttle and the compressor inlet. Depending on the state of ASOV 391 and CBV 330, the reduction in pressure may increase motive flow through aspirator 380 and/or bypass passage 328. In other examples, however, there may be no AIS throttle; instead, flow through aspirator 380 may be regulated via control of the ASOV alone, and/or flow through bypass passage 328 may be regulated via control of the CBV alone.

Further, in contrast to the embodiment of FIGS. 1-2 wherein a CIP sensor is arranged immediately upstream of the compressor, in the second embodiment a sensor 341 is arranged in intake passage 318 in the vicinity of a juncture of passage 388 and intake passage 318 (e.g., downstream of AIS throttle 331 and upstream of a juncture of bypass passage 328 and intake passage 318). Sensor 341 may provide a signal to controller 50 regarding the pressure at the motive outlet of aspirator 380.

Another difference between the first embodiment and the second embodiment involves the suction flow sources for aspirator 380. In the first embodiment, the suction passages for the throat tap and exit tube tap merge into a common passage which is coupled with vacuum reservoir 38 for use by vacuum actuators 39, whereas the suction passage for the diverging cone tap is coupled with a fuel vapor purge system 71. In contrast, in the second embodiment, all three suction passages merge into a common passage 389 which is coupled with vacuum reservoir 338 for use by vacuum actuators 339. Because exit tube tap 387 is coupled with vacuum reservoir 338 via check valve 376, check valve 376 may allow air to flow to intake manifold 324 from vacuum reservoir 338 and may limit air flow to vacuum reservoir 38 from intake manifold 24. During conditions where the intake manifold pressure is negative (e.g., when vacuum is deeper than 0.1 bar), the intake manifold may be a vacuum source for vacuum reservoir 338. In examples where vacuum consumption device 339 is a brake booster, inclusion of suction passage 386 in the system may advantageously provide a bypass path which may ensure that the brake booster is evacuated nearly instantaneously whenever intake manifold pressure is lower than brake booster pressure.

Yet another difference between the first embodiment and the second embodiment is that the second embodiment includes a passage 393 coupling vacuum reservoir 338 to intake manifold 324. As shown, a check valve 394 may be arranged in passage 393 to prevent backflow from the intake manifold to the vacuum reservoir. In examples where vacuum consumption device 339 is a brake booster, the intake manifold may achieve a deep vacuum when a driver's foot is removed from the accelerator pedal, and inclusion of passage 393 in the system may serve to prepare the brake booster as the driver's foot is being released from the accelerator pedal.

Figure 5:
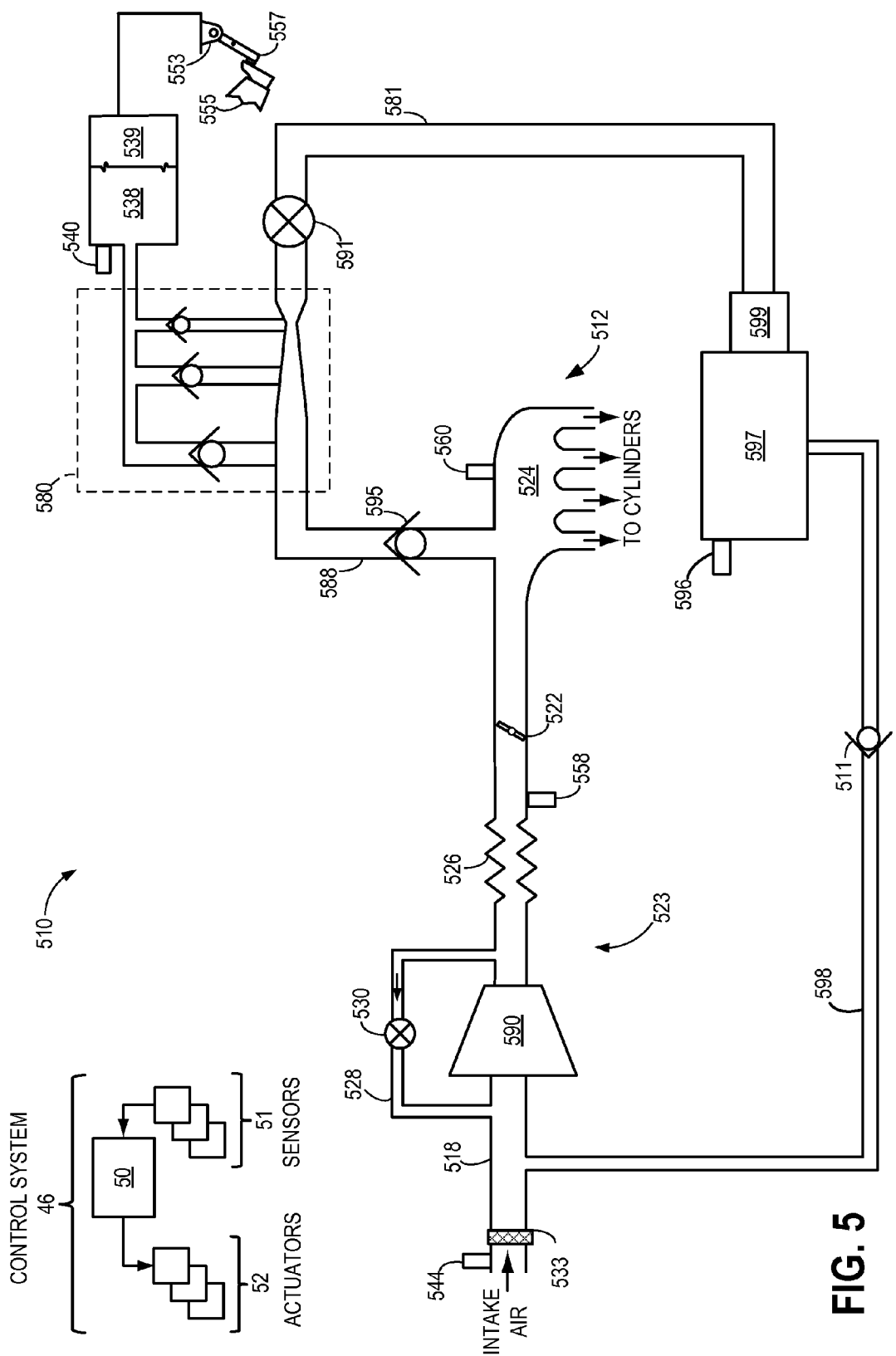
FIG. 5 shows a schematic diagram of a third embodiment of an engine system including a multiple tap aspirator.

A third embodiment of an engine system including a multiple tap aspirator is depicted in FIG. 5. The third embodiment includes many of the same features described above for the first and second embodiments; similar features are numbered similarly and will not be described again for the sake of brevity. Further, it will be appreciated that various features among the three embodiments are usable together. While the suction passages of aspirator 580 of FIG. 5 are shown in the configuration depicted in FIG. 4 (in that they are all coupled to the vacuum reservoir via a common passage), it is also anticipated that the suction passages of aspirator 580 may be configured in the manner shown in FIG. 2, or in another suitable manner (e.g., one or more suction passages may be coupled to a different vacuum source within the engine system), without departing from the scope of this disclosure.

As in the previous embodiments, in the embodiment of FIG. 5, intake manifold 524 is configured to supply intake air or an air-fuel mixture to a plurality of cylinders or combustion chambers of engine 512. The combustion chambers may be arranged above a lubricant-filled crankcase 597, in which reciprocating pistons of the combustion chambers rotate a crankshaft. The reciprocating pistons may be substantially isolated from the crankcase via one or more piston rings, which suppress the flow of the air-fuel mixture and of combustion gasses into the crankcase. Nevertheless, a significant amount of fuel vapor, un-burned air, and exhaust gases may 'blow by' the piston rings and enter the crankcase over time. To reduce the degrading effects of the fuel vapor on the viscosity of the engine lubricant and to reduce the discharge of the vapor into the atmosphere, the crankcase may be continuously or periodically ventilated, as further described hereinafter.

While a crankcase ventilation system may be included in the previous embodiments as well, it is depicted in this embodiment because it is coupled with the motive inlet of aspirator 580. That is, whereas in the previous embodiments the motive inlet of the aspirator communicates with the intake passage, in the embodiment of FIG. 5 the motive inlet of aspirator 580 communicates with crankcase 597.

It will be appreciated that, as used herein, crankcase ventilation flow refers to the flow of fuel vapor and gases from the crankcase through passage 581, through aspirator 580, through passage 588, and then into the intake manifold. Similarly, as used herein, crankcase backflow refers to the flow of fuel vapors and gases from the intake manifold to the crankcase via passage 588, aspirator 580, and passage 581. Backflow may occur when intake manifold pressure is higher than crankcase pressure (e.g., during boosted engine operation). As shown, check valve 595 may be coupled between intake manifold 524 and crankcase 597, in passage 581, for preventing crankcase backflow.

Crankcase 597 may include one or more oil separators 599 for separating oil from the crankcase vapors (or "blowby gas") before the vapors are purged to intake manifold 524 via aspirator 580. Further, the pressure of fuel vapors in crankcase 597 may be determined by crankcase pressure sensor 596.

As in the previous embodiments, the embodiment of FIG. 5 includes an ASOV 591 arranged in series with the motive inlet of aspirator 580. Advantageously, the positioning of ASOV 591 enables it to act as a crankcase ventilation valve, controlling the purging of fuel vapors from the crankcase into the intake manifold, in addition to controlling vacuum generation via aspirator 580. As in the previous embodiments, ASOV 591 may be an electronically controlled valve. In this case, controller 50 may command a signal to change a position of ASOV 591 from an open position (or a position of high flow) to a closed position (or a position of low flow), or vice versa, or any position therebetween. Alternatively, ASOV 591 may be a valve that varies its flow restriction in response to the pressure drop across it (or flow rate through it). It is also anticipated that ASOV 591 may be a one-way passive valve that provides continual evacuation of crankcase gases from inside the crankcase 597 before connecting to the intake manifold 524. The one-way valve may seal against flow in the opposite direction (e.g., flow from the intake manifold to the crankcase).

As shown, crankcase 597 is coupled to intake passage 518 downstream of air cleaner 533 and upstream of compressor 590 and compressor recirculation passage 528 via passage 598. Depending on a pressure differential between the intake passage and the crankcase, fresh air may be drawn from the intake passage into crankcase 597 via passage 598, to ventilate the crankcase. A check valve 511 arranged in passage 598 prevents backflow from the crankcase to the intake passage.

Figure 6:
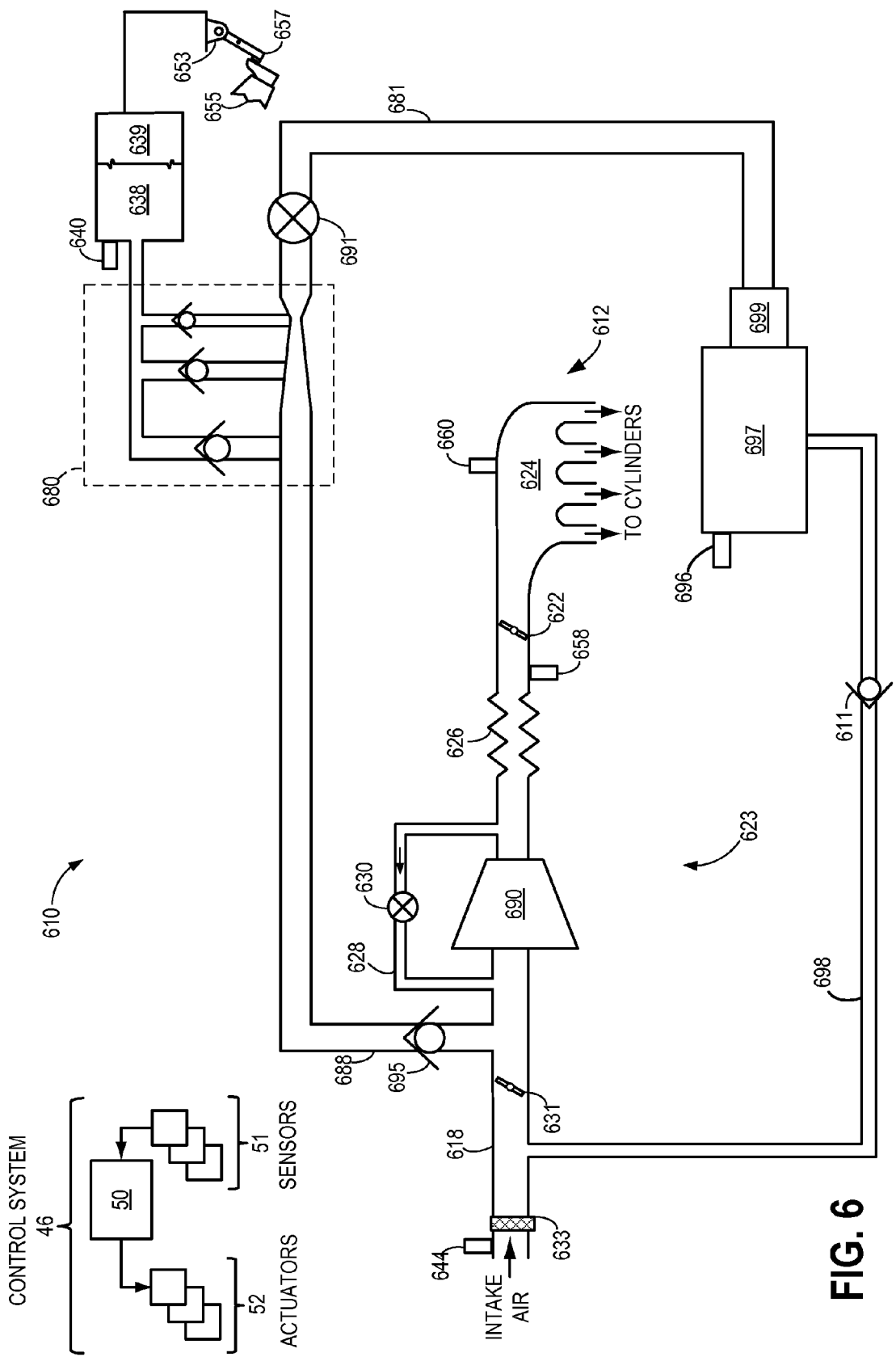
FIG. 6 shows a schematic diagram of a fourth embodiment of an engine system including a multiple tap aspirator.
Figure 7:
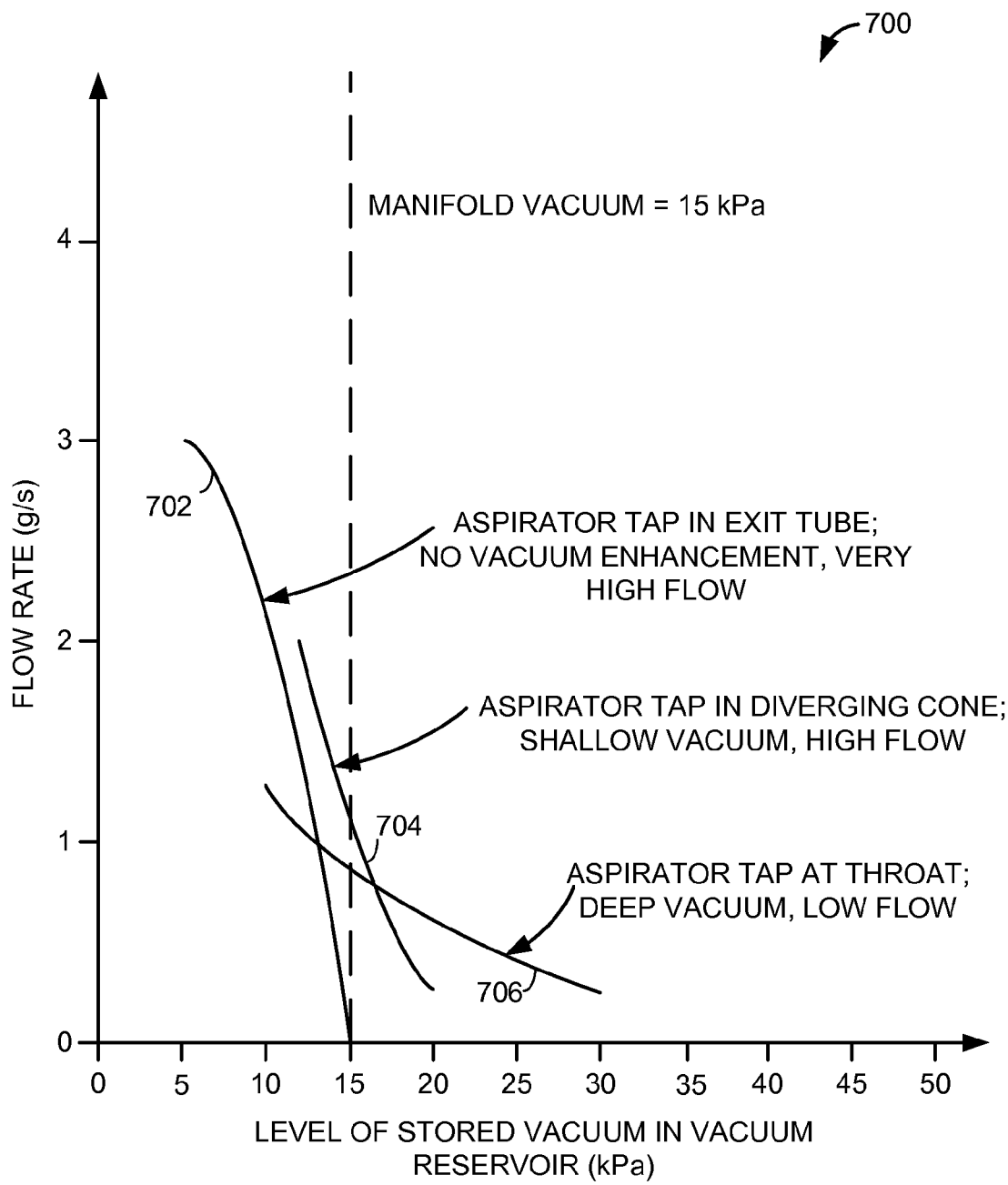
FIG. 7 shows a graph of exemplary relationships between flow rate at each suction tap of a multiple tap aspirator and vacuum reservoir vacuum level at an intake manifold vacuum level of 15 kPa.

A fourth embodiment of an engine system including a multiple tap aspirator is depicted in FIG. 6. The fourth embodiment includes many of the same features described above for the first, second, and third embodiments; similar features are numbered similarly and will not be described again for the sake of brevity. Further, it will be appreciated that various features among the four embodiments are usable together. While the suction passages of aspirator 680 of FIG. 6 are shown in the configuration depicted in FIGS. 4 and 6 (in that they are all coupled to the vacuum reservoir via a common passage), it is also anticipated that the suction passages of aspirator 680 may be configured in the manner shown in FIG. 2, or in another suitable manner (e.g., one or more suction passages may be coupled to a different vacuum source within the engine system), without departing from the scope of this disclosure.

Like the embodiment of FIG. 5, the embodiment of FIG. 6 includes a crankcase ventilation system coupled with the motive inlet of aspirator 680. However, unlike the embodiment of FIG. 5, the mixed flow outlet of aspirator 680 is coupled with the intake passage upstream of compressor 690 and compressor recirculation passage 628, and downstream of AIS throttle 631. A position of AIS throttle 631 may be controlled by controller 50 to vary the pressure in the intake passage intermediate AIS throttle and the inlet of compressor 690, which may influence a level of or rate of flow through aspirator 580 (e.g., crankcase ventilation flow through aspirator 580) into the intake passage, as well as an amount of compressor recirculation flow via compressor recirculation passage 628, depending on a state of CRV 630.

Graph 700 of FIG. 7 depicts the flow rates through the suctions passages coupled to the exit tube tap, diverging cone tap, and throat tap of a multiple tap aspirator such as the multiple tap aspirators in the embodiments of FIGS. 3-6 (e.g., embodiments wherein all of the aspirator's suction taps are coupled with a same vacuum reservoir). The x-axis of graph 700 represents flow rate (g/s), and the y-axis represents vacuum reservoir vacuum (kPa).

While graph 700 depicts exemplary flow rates through aspirator suction passages for an intake manifold vacuum level of 15 kPa (as represented by the dashed vertical line at 15 kPa), it will be appreciated that similar graphs may be created for different intake manifold vacuum levels. Further, the numeric values of flow rate and stored vacuum level shown in FIG. 7 are provided for exemplary purposes only; actual values may vary based on the dimensions and geometry of various engine system components such as the aspirator and associated passages.

As shown in graph 700, the flow rate in a given suction passage may vary with the level of stored vacuum in the vacuum reservoir. Characteristic 702 represents the flow rate through the exit tube suction passage of the aspirator (e.g., the flow rate of fluid traveling from the vacuum reservoir into the exit tube tap of the aspirator). In the depicted example, when the level of stored vacuum in the vacuum reservoir is less than intake manifold vacuum, fluid flows from the vacuum reservoir into the exit tube tap, at a rate which decreases as the level of stored vacuum in the vacuum reservoir approaches the intake manifold vacuum level (in this example, 15 kPa). As discussed herein, while fluid flow into the exit tube tap of the aspirator does not harness the venturi effect so as to generate vacuum, as the exit tube may be a straight tube, such flow may advantageously provide a fast pull-down of the vacuum reservoir (e.g., fast pull-down of the brake booster in examples where the vacuum reservoir is a vacuum reservoir of a brake booster) during conditions where the intake manifold vacuum is greater than the vacuum reservoir vacuum. That is, whereas vacuum may be generated via fluid flow into the throat tap and diverging cone tap of the aspirator, at a lower rate, fluid may flow into the exit tube tap at a higher rate without generating vacuum, which may be desirable during certain engine operating conditions such as when intake manifold vacuum is deeper than brake booster vacuum.

Characteristic 704 represents the flow rate through the diverging cone tap suction passage of the aspirator (e.g., the flow rate of fluid traveling from the vacuum reservoir into the diverging cone tap of the aspirator). In the depicted example, when the level of stored vacuum in the vacuum reservoir ranges from approximately 12 kPa to approximately 20 kPa, fluid flows from the vacuum reservoir into the diverging cone tap, at a rate which decreases as the level of stored vacuum in the vacuum reservoir increases. As shown, the absolute value of the slope of characteristic 704 may be less than the absolute value of the slope of characteristic 702, for example as a result of the increase in vacuum stored in the vacuum reservoir that occurs due to generation of vacuum via the flow of fluid from the vacuum reservoir into the diverging cone tap of the aspirator.

Characteristic 706 represents the flow rate through the throat tap suction passage of the aspirator (e.g., the flow rate of fluid traveling from the vacuum reservoir into the throat tap of the aspirator). In the depicted example, when the level of stored vacuum in the vacuum reservoir ranges from approximately 10 kPa to approximately 30 kPa, fluid flows from the vacuum reservoir into the throat tap, at a rate which decreases as the level of stored vacuum in the vacuum reservoir increases. As shown, the absolute value of the slope of characteristic 706 may be less than the absolute value of characteristic 704, for example as a result of the generation of vacuum in the vacuum reservoir that occurs due to the flow of fluid from the vacuum reservoir into both the diverging cone tap of the aspirator and the throat tap of the aspirator.

As discussed herein, while fluid flow into the exit tube tap of the aspirator may not harness the venturi effect, as the exit tube may be a straight tube, such flow may provide fast pull-down of the vacuum reservoir (e.g., fast pull-down of the brake booster in examples where the vacuum reservoir is a vacuum reservoir of a brake booster) during conditions where the intake manifold vacuum is greater than the vacuum reservoir vacuum. That is, whereas more vacuum may be generated via fluid flow into the throat tap and diverging cone tap of the aspirator, at a lower rate, relatively less vacuum may be generated via fluid flow into the exit tube tap at a higher rate, which may be desirable during certain engine operating conditions.

In view of the suction flow characteristics for the different suction taps of the multiple tap aspirator shown in FIG. 7, it will be appreciated that the multiple tap aspirator described herein may advantageously provide both high vacuum generation (e.g., via the throat tap and diverging cone tap) and high suction flow (e.g., via the exit tube tap). This is in contrast to traditional aspirators which may provide either high vacuum generation or high suction flow but not both. Further, the multiple tap aspirator described herein may advantageously provide optimal suction flow at all vacuum reservoir levels due to the strategic placement of the different suction taps. Furthermore, due to the placement of the check valves in the aspirator suction tubes, suction flow need only pass through one check valve, as opposed to multiple check valves, which may minimize flow losses. Moreover, due to the inclusion of a check valve in each suction passage, vacuum in the vacuum reservoir may be retained even when motive flow through the aspirator ceases.

Figure 8:
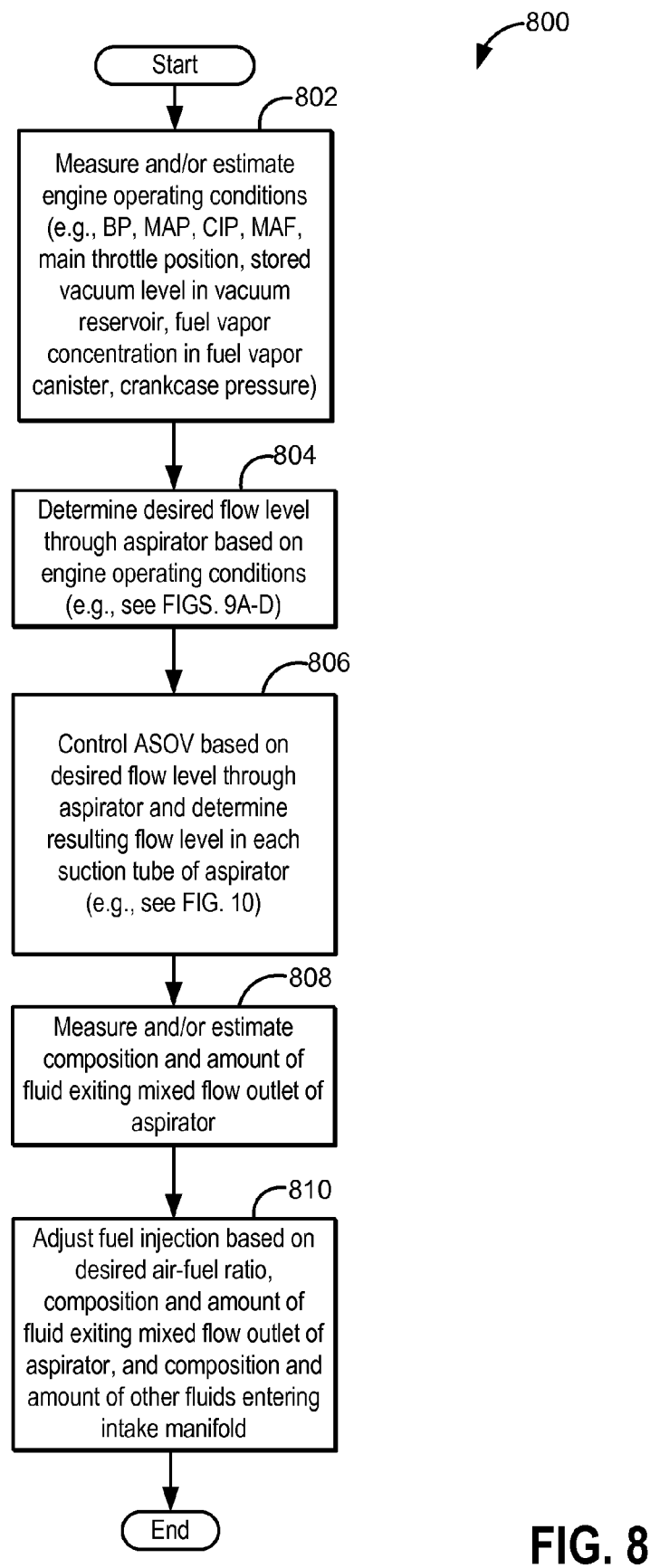
FIG. 8 shows an example method for controlling an engine system including a multiple tap aspirator, such as the engine systems of FIGS. 1, 3, 5, and 6.

Now referring to FIG. 8, an example method 800 for controlling an engine system including a multiple tap aspirator is provided. Method 800 may be used in conjunction with the engine systems and multiple tap aspirators depicted in FIGS. 1-6, and with the methods shown in FIGS. 9A-D and 10, for example.

At 802, method 800 includes measuring and/or estimating engine operating conditions. Engine operating conditions may include, for example, BP, MAP, CIP, MAF, main throttle position, stored vacuum level (e.g., in the vacuum reservoir), engine speed, engine temperature, catalyst temperature, boost level, ambient conditions (temperature, humidity.), fuel vapor concentration in the fuel vapor canister, crankcase pressure, etc.

After 802, method 800 proceeds to 804. At 804, method 800 includes determining a desired flow level through the aspirator based on engine operating conditions. In the context of the engine system depicted in FIG. 1, the determination may be made in accordance with the method of FIG. 9A, which will be described below; in the context of the engine system depicted in FIG. 3, the determination may be made in accordance with the method of FIG. 9B; in the context of the engine system depicted in FIG. 5, the determination may be made in accordance with the method of FIG. 9C; and in the context of the engine system depicted in FIG. 6, the determination may be made in accordance with the method of FIG. 9D (FIGS. 9A-D will be described below).

After 804, method 800 proceeds to 806. At 806, method 800 includes controlling the ASOV (e.g., the valve arranged in series with the aspirator which contributes to the regulation of flow through the aspirator) based on the desired flow level (e.g., the desired flow level determined at 804). Further, at 806, method 800 includes determining the flow level in each suction tube of the aspirator which results from said control of the ASOV. For example, these actions may be performed in accordance with the method of FIG. 10, which will be described below.

After 806, method 800 proceeds to 808. At 808, method 800 includes measuring and/or estimating the composition and amount of fluid exiting the mixed flow outlet of the aspirator. For example, the composition and amount of fluid exiting the mixed flow outlet of the aspirator may be estimated based on the flow levels in each suction tube of the aspirator determined at step 806 and further based on parameter values detected by various sensors. In the context of the first embodiment, where suction flow entering the exit tube tap includes some concentration of fuel vapors from the fuel vapor canister, the composition of the fluid exiting the mixed flow outlet of the aspirator may be based on the relative amounts of suction flow in the three suction taps (as determined at 806, for example) and based on an inference of fuel vapor concentration exiting the fuel vapor canister. The inference may be based on sensed exhaust gas composition, for example. Alternatively, dedicated sensors may be arranged in the suction passage coupled to the exit tube tap or elsewhere to directly measure the fuel vapor concentration entering the intake manifold from the fuel vapor purge system via the exit tube tap. In the context of the remaining embodiments, where all suction taps of the aspirator are coupled with the vacuum reservoir, the measurement/estimation of the composition of fluid exiting the mixed flow outlet of the aspirator may involve measuring/estimating the composition of the motive flow through the aspirator, depending on where the aspirator is coupled in the engine system. For example, in the engine system of FIGS. 5 and 6, crankcase gases provide the motive flow through the aspirator, and therefore the proportion of motive flow versus suction flow in the flow exiting the mixed flow outlet of the aspirator as well as the measured/estimated composition of the crankcase gases serving as the motive flow may factor into the measurement/estimation of the composition of the fluid exiting the mixed flow outlet of the aspirator.

After 808, method 800 proceeds to 810. At 810, method 800 includes adjusting fuel injection based a desired engine air-fuel ratio, the composition and amount of fluid exiting the mixed flow outlet of the aspirator (e.g., as determined at 808), and the composition and amount of any other fluids entering the intake manifold. For example, in embodiments where the flow exiting the mixed flow outlet of the aspirator includes fuel vapor purge gases, if the fuel vapor concentration of flow exiting the mixed flow outlet of the aspirator would result in a greater than desired proportion of fuel in the engine cylinders, fuel injection may be adjusted (e.g., decreased via decrease in pulse width of fuel injection or frequency of fuel injection) to achieve a desired engine air-fuel ratio. After 810, method 800 ends.

Figure 9A:
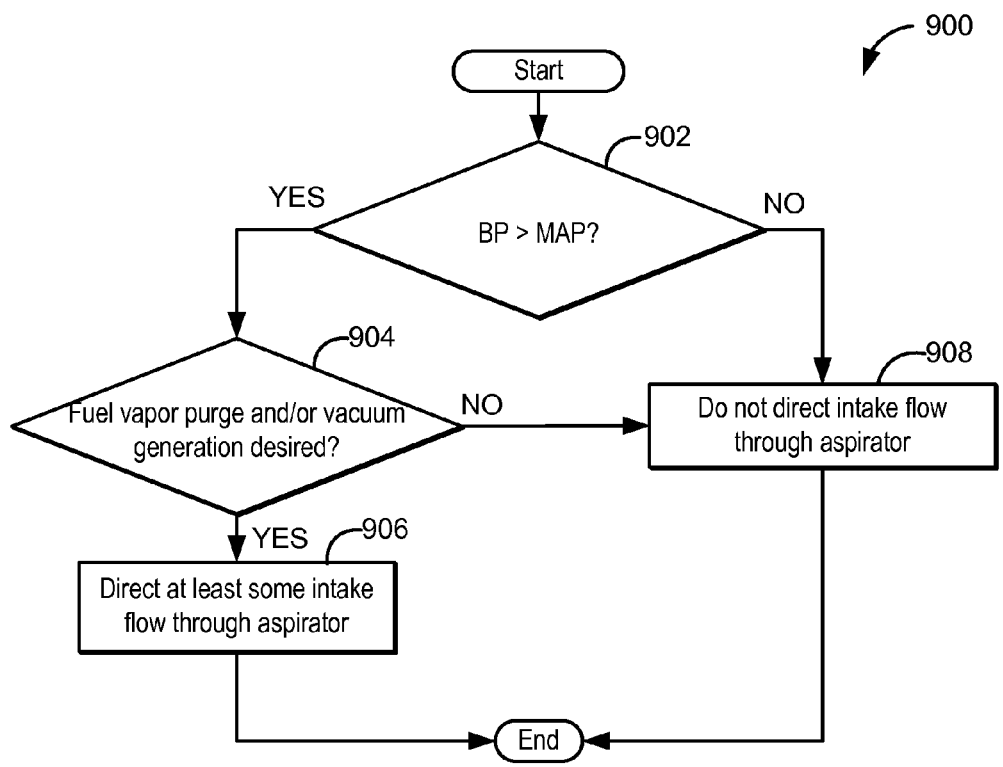
FIG. 9A shows an example method for determining a desired flow level through a multiple tap aspirator such as the multiple tap aspirator in the configuration depicted in FIG. 1.

In FIG. 9A, an example method 900 is provided for determining a desired flow level through a multiple tap aspirator such as the multiple tap aspirator depicted in FIG. 1. Method 900 may be used in conjunction with the method 800 of FIG. 8 and method 1000 of FIG. 10, for example.

At 902, method 900 includes determining whether BP is greater than MAP. For example, in the context of engine system 10 of FIG. 1, the determination may be made by controller 50 based on signals received from BP sensor 44 and MAP sensor 60.

If the answer at 902 is YES, method 900 proceeds to 904. At 904, method 900 includes determining whether fuel vapor purge and/or vacuum generation is desired. For example, whether fuel vapor purge is desired may be determined based on a signal provided to the controller from the pressure sensor in the fuel vapor canister, and whether vacuum generation is desired may be made based on a level of stored vacuum in the vacuum reservoir (e.g., as sensed by a vacuum and/or pressure sensor in the vacuum reservoir) and/or based on vacuum request from various engine vacuum consumers. If the answer at 904 is YES, method 900 proceeds to 906. At 906, method 900 includes directing at least some intake flow through the aspirator. For example, as described below with reference to FIG. 10, intake flow may be directed through the aspirator by increasing opening of the ASOV arranged in series with the aspirator. After 906, method 900 ends.

Otherwise, if the answer at 904 is NO, method 900 proceeds to 908. At 908, intake flow is not directed through the aspirator. For example, as described below with reference to FIG. 10, not directing intake flow through the aspirator may include closing the ASOV arranged in series with the aspirator. After 908, method 900 ends.

Returning to 902, if the answer is NO, method 900 proceeds to step 908 and intake flow is not directed through the aspirator. After 908, method 900 ends.

Figure 9B:
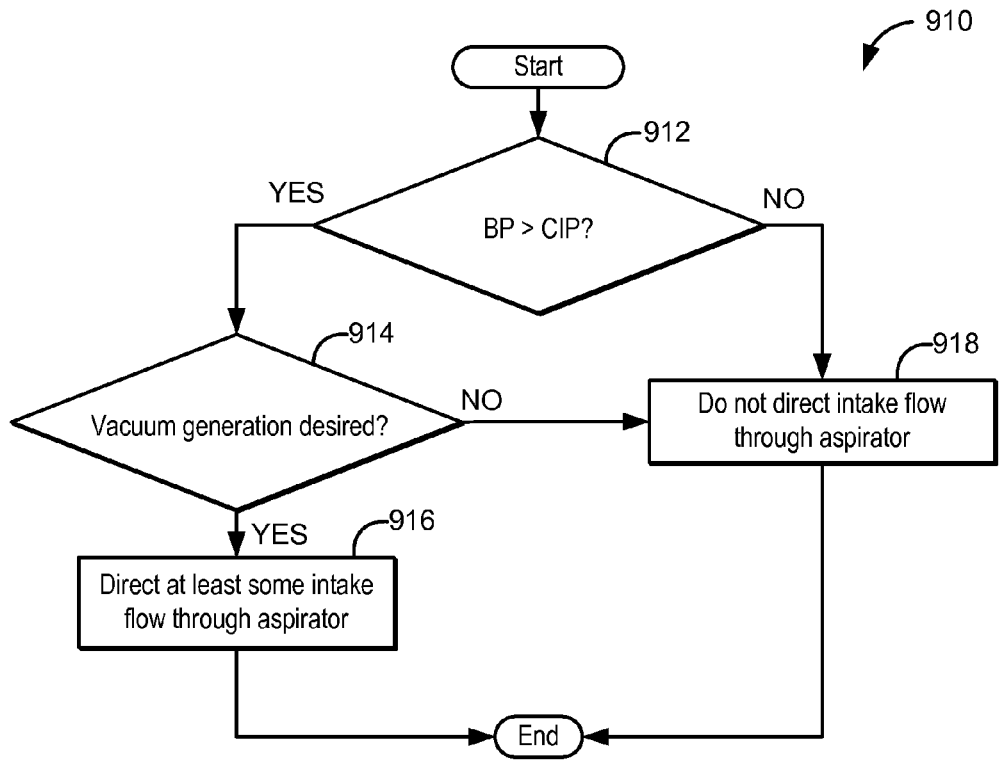
FIG. 9B shows an example method for determining a desired flow level through a multiple tap aspirator such as the multiple tap aspirator in the configuration depicted in FIG. 3.

In FIG. 9B, an example method 910 is provided for determining a desired flow level through a multiple tap aspirator such as the multiple tap aspirator depicted in FIG. 3. Method 910 may be used in conjunction with the method 800 of FIG. 8 and method 1000 of FIG. 10, for example.

At 912, method 900 includes determining whether BP is greater than CIP. For example, in the context of engine system 310 of FIG. 3, the determination may be made by controller 50 based on signals received from BP sensor 344 and MAP sensor 360.

If the answer at 912 is YES, method 910 proceeds to 914. At 914, method 910 includes determining whether vacuum generation is desired. If the answer at 914 is YES, method 910 proceeds to 916. At 916, method 910 includes directing at least some intake flow through the aspirator, for example in the manner discussed above for step 906 of method 900. Further, in the context of the engine system of FIG. 3, directing at least some intake flow through the aspirator may additionally include adjusting the AIS throttle, e.g. to modify the pressure in the intake passage at a juncture of the intake passage and the mixed flow outlet of the aspirator. After 916, method 910 ends.

Otherwise, if the answer at 914 is NO, method 910 proceeds to 918. At 918, intake flow is not directed through the aspirator, for example in the manner discussed above for step 908 of method 900. After 918, method 910 ends.

Returning to 912, if the answer is NO, method 910 proceeds to step 918 and intake flow is not directed through the aspirator. After 918, method 910 ends.

Figure 9C:
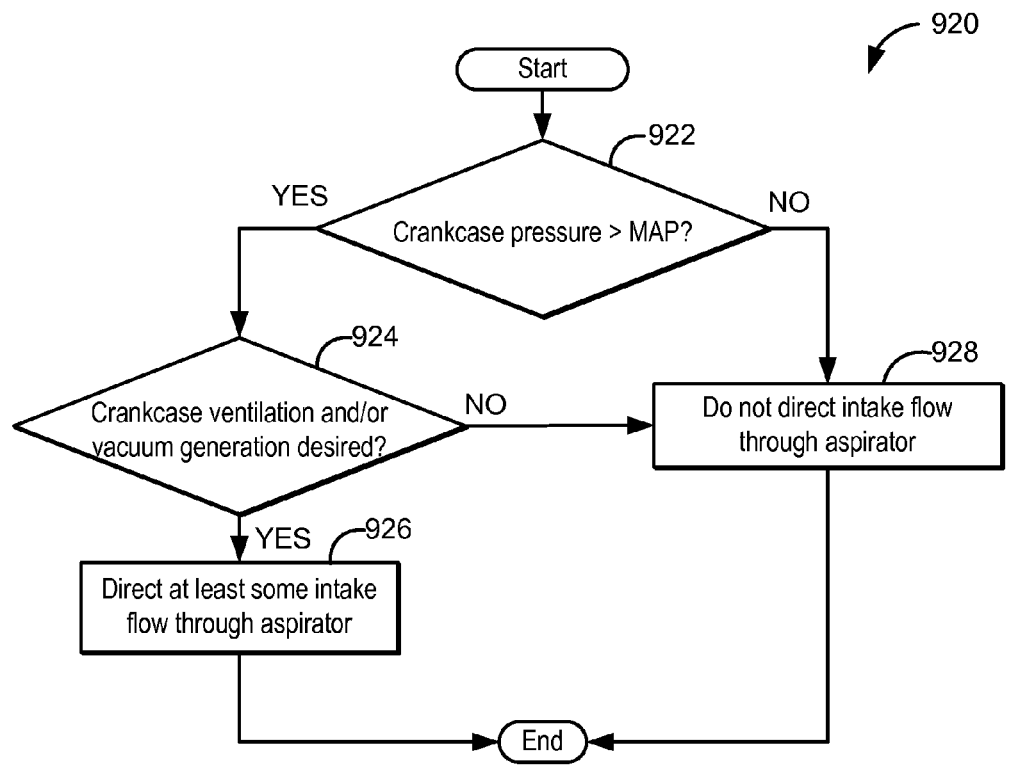
FIG. 9C shows an example method for determining a desired flow level through a multiple tap aspirator such as the multiple tap aspirator in the configuration depicted in FIG. 5.

In FIG. 9C, an example method 920 is provided for determining a desired flow level through a multiple tap aspirator such as the multiple tap aspirator depicted in FIG. 5. Method 920 may be used in conjunction with the method 800 of FIG. 8 and method 1000 of FIG. 10, for example.

At 922, method 920 includes determining whether crankcase pressure is greater than MAP. For example, in the context of engine system 510 of FIG. 5, the determination may be made by controller 50 based on signals received from crankcase pressure sensor 596 and MAP sensor 560.

If the answer at 922 is YES, method 920 proceeds to 924. At 924, method 920 includes determining whether crankcase ventilation and/or vacuum generation is desired. For example, whether crankcase ventilation is desired may be determined based on a signal provided to the controller from the pressure sensor in the crankcase, and whether vacuum generation is desired may be determined in the manner described above for step 904 of method 900. If the answer at 924 is YES, method 920 proceeds to 926. At 926, method 920 includes directing at least some intake flow through the aspirator. After 926, method 920 ends.

Otherwise, if the answer at 924 is NO, method 920 proceeds to 928. At 928, method 920 includes not directing intake flow through the aspirator. After 928, method 920 ends.

Returning to 922, if the answer is NO, method 920 proceeds to step 928, which is described above. After 928, method 920 ends.

Figure 9D:
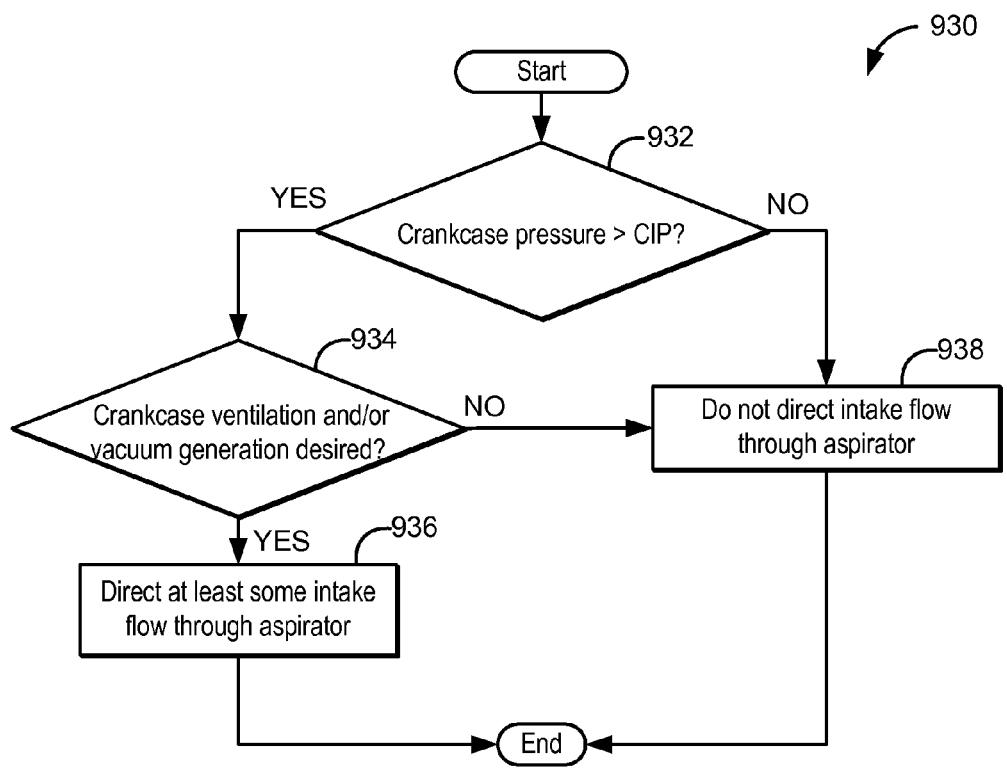
FIG. 9D shows an example method for determining a desired flow level through a multiple tap aspirator such as the multiple tap aspirator in the configuration depicted in FIG. 6.

In FIG. 9D, an example method 930 is provided for determining a desired flow level through a multiple tap aspirator such as the multiple tap aspirator depicted in FIG. 6. Method 930 may be used in conjunction with the method 800 of FIG. 8 and method 1000 of FIG. 10, for example.

At 932, method 930 includes determining whether crankcase pressure is greater than CIP. For example, in the context of engine system 610 of FIG. 6, the determination may be made by controller 50 based on signals received from crankcase pressure sensor 696 and MAP sensor 660.

If the answer at 932 is YES, method 930 proceeds to 934. At 934, method 930 includes determining whether crankcase ventilation and/or vacuum generation is desired, for example in the manner described above for step 924 of method 920. If the answer at 934 is YES, method 930 proceeds to 936. At 936, method 930 includes directing at least some intake flow through the aspirator. Here again, directing at least some intake flow through the aspirator may additionally include adjusting the AIS throttle, e.g. to modify the pressure in the intake passage at a juncture of the intake passage and the mixed flow outlet of the aspirator. After 936, method 930 ends.

Otherwise, if the answer at 934 is NO, method 930 proceeds to 938. At 938, intake flow is not directed through the aspirator. After 938, method 930 ends.

Returning to 932, if the answer is NO, method 930 proceeds to step 938, which is described above. After 938, method 930 ends.

Figure 10:
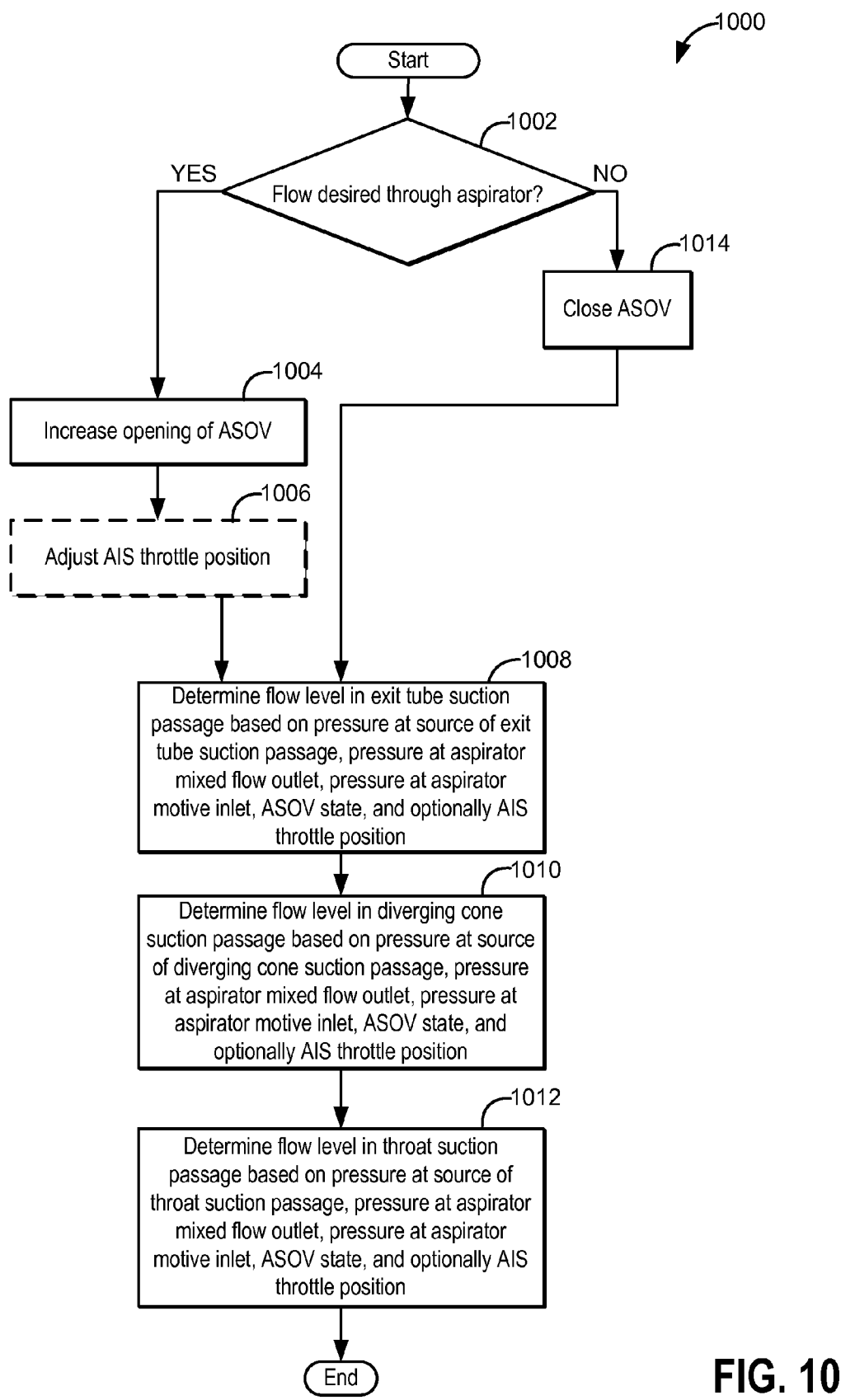
FIG. 10 shows an example method for controlling an ASOV based on a desired flow level through a multiple tap aspirator and determining a resulting flow level in each suction tube of the aspirator.

Now referring to FIG. 10, an example method 1000 is provided for controlling an ASOV based on a desired flow level through a multiple tap aspirator and determining a resulting flow level in each suction tube of the aspirator. Method 1000 may be used in conjunction with the engine systems and multiple tap aspirators depicted in FIGS. 1-6, and with the methods shown in FIGS. 9A-D and 10, for example.

At 1002, if flow through the aspirator is desired (e.g., as determined via the routine of one of FIGS. 9A-D), method 1000 proceeds to 1004 to increase opening of the ASOV. In examples where the ASOV is a binary valve with two positions, open and closed, increasing opening of the ASOV may include controlling the ASOV to be in the open state, or keeping the ASOV in the open state if it is already open. Alternatively, in examples where the ASOV is a continuously variable valve which may be partially opened to varying degrees, increasing opening of the ASOV may include increasing an opening degree or amount of the valve or controlling the valve to remain at a given opening degree or amount if the valve is already in the desired state. When the ASOV is open, depending on the pressure differential between the motive inlet of the aspirator and the mixed flow outlet of the aspirator, a motive flow may pass through the aspirator, which may generate suction flow at one or more of the taps of the aspirator depending on the pressure differential(s) between source(s) of suction flow and the mixed flow outlet of the aspirator arrangement.

After 1004, method 1000 may optionally proceed to 1006 when performed in the context of an engine system such as the engine systems of FIGS. 3 and 6, where the mixed flow outlet of the aspirator is coupled to the intake passage downstream of the AIS throttle. In such examples, additional regulation of flow through the aspirator may be achieved via adjustment of the AIS throttle. By increasing closing of the AIS throttle, pressure in the intake passage downstream of the AIS throttle may be reduced, which may increase the pressure differential between the aspirator's motive inlet and mixed flow outlet (thereby increasing flow through the aspirator). Similarly, by increasing opening of the AIS throttle, pressure in the intake passage downstream of the AIS throttle may be increased, which may decrease the pressure differential between the aspirator's motive inlet and mixed flow outlet (thereby decreasing flow through the aspirator). In some examples, the AIS throttle adjustment may be based on pressure at the motive inlet of the aspirator and pressure at the mixed flow outlet of the aspirator; control of the AIS throttle and ASOV may be coordinated to achieve a desired flow rate/amount/level through the aspirator. In case of malfunction or failure of the ASOV, e.g. if the ASOV fails in an open position, adjustment of the AIS throttle may potentially serve to regulate flow through the aspirator arrangement. As adjustment of the AIS throttle may also affect flow through a compressor bypass passage (in examples where a compressor bypass passage directs flow from downstream of the compressor to upstream of the compressor depending on a state of a CBV arranged in the compressor bypass passage), the adjustment may also take into consideration compressor recirculation flow needs. For example, when it is necessary to reduce compressor surge, closing of the AIS throttle may be increased and the CBV may be opened; if an increase in flow through the aspirator (which may result from the deepening of vacuum due to the increase in closing of the AIS throttle) is not desired during such conditions, the ASOV may be closed.

After optional step 1006, method 1000 proceeds to 1008. At 1008, method 1000 includes determining the flow level in the exit tube suction passage based on the pressure at the source of the exit tube suction passage, the pressure at the aspirator's mixed flow outlet, the pressure at the aspirator's motive inlet, ASOV state, and optionally AIS throttle position. The amount of suction flow at a given suction passage, if any, at a given time during engine operation may be a function of the level of motive flow through the aspirator, the geometry of the aspirator (e.g., the cross-sectional flow area of the aspirator and the various suction taps of the aspirator, the placement of the suction taps, the cross-sectional flow area of the suction passages coupled to the aspirator suction taps, and any other structural features of the aspirator affecting motive and suction flow), and the relative pressures at the source(s) and sink(s) of the suction passages. In contrast, in the context of the engine systems of the second, third, and fourth engine system embodiments described herein, wherein all of the aspirator taps are coupled to a common vacuum reservoir, the source of the exit tube suction passage is the vacuum reservoir, and thus the pressure differential between the vacuum reservoir and the sink of the aspirator arrangement (e.g., the compressor inlet in the engine systems of FIGS. 3 and 6, and the intake manifold in the engine systems of FIG. 5) may factor into the determination of the flow level in the exit tube suction passage. As noted above, exemplary flow rates through the exit tube suction passage of the aspirator over a range of vacuum reservoir vacuums (in the context of the embodiments of FIGS. 3, 5, and 6) are depicted by characteristic 702 of FIG. 7 for an intake manifold vacuum level of 15 kPa.

After 1008, method 1000 proceeds to 1010. At 1010, method 1000 includes determining the flow level in the diverging cone suction passage of the aspirator based on the pressure at the source of the diverging cone suction passage, the pressure at the mixed flow outlet of the aspirator, the pressure at the motive inlet of the aspirator, the ASOV state, and optionally the AIS throttle position. Step 1010 may be performed similarly to step 1008 described above. In the embodiments depicted herein, the diverging cone tap of the aspirator is coupled with a vacuum reservoir via a suction passage, and thus the source of the diverging cone suction passage in these embodiments is the vacuum reservoir. In the depicted embodiments, the pressure differential between the vacuum reservoir and the mixed flow outlet of the aspirator may factor into the determination of the flow level in the diverging cone suction passage. For example, in the context of the engine systems depicted in FIGS. 3, 5, and 6, fluid flows into the diverging cone tap via the diverging cone suction passage when the pressure in the vacuum reservoir is higher than the pressure in the intake manifold (e.g., when a negative pressure or vacuum level in the vacuum reservoir is lower than a negative pressure or vacuum level in the intake manifold). When the pressure in the intake manifold increases to a level higher than the pressure level in the vacuum reservoir (e.g., when vacuum in the vacuum reservoir is deeper than vacuum in the intake manifold), fluid may still flow from the vacuum reservoir into the diverging cone tap of the aspirator via the diverging cone suction passage and to the intake manifold. Upon further deepening of vacuum reservoir vacuum (e.g., when vacuum reservoir vacuum increases above a threshold/when vacuum reservoir pressure decreases below a threshold), the check valve in the suction passage coupled to the diverging cone tap closes, thereby preventing backflow from the intake manifold to the vacuum reservoir via the diverging cone tap. It will be appreciated that the check valve may be set to close at a desired vacuum level, or a check valve may be selected which closes at a desired vacuum level, to provide desired performance (e.g., to prevent reverse flow at a desired level of vacuum reservoir vacuum). Exemplary flow rates through the diverging cone suction passage of the aspirator over a range of vacuum reservoir vacuums (in the context of the embodiments of FIGS. 3, 5, and 6) are depicted by characteristic 704 of FIG. 7 for an intake manifold vacuum level of 15 kPa.

However, the diverging cone suction passage may have a different source, such as a fuel vapor purge system, crankcase, or other engine system or component, without departing from the scope of this disclosure. For example, in the context of the first engine system embodiment described herein, the diverging cone tap of the aspirator is coupled to a fuel vapor purge system at its source. Because the mixed flow outlet of the aspirator is coupled to the intake manifold in this embodiment, the pressure differential between the fuel vapor purge system (e.g., the fuel vapor purge canister) and the intake manifold may factor into the determination of the flow level in the diverging cone suction passage. For example, when the pressure in the fuel vapor canister is higher than the pressure in the intake manifold (e.g., when a negative pressure or vacuum level in the fuel vapor canister is lower than a negative pressure or vacuum level in the intake manifold), fluid may flow from the fuel vapor canister into the diverging cone of the aspirator, and then to the intake manifold. When the pressure in the fuel vapor canister decreases to a level lower than a pressure level in the intake manifold, however, the check valve in the suction passage coupled to the diverging cone tap closes, and flow in the suction passage ceases (e.g., to prevent backflow from the intake manifold to the fuel vapor canister).

After 1010, method 1000 proceeds to 1012. At 1012, method 1000 includes determining the flow level in the throat suction passage based on the pressure at the source of the throat suction passage, the pressure at the aspirator mixed flow outlet, the pressure at the aspirator motive inlet, ASOV state, and optionally AIS throttle position. Step 1012 may be performed similarly to steps 1008 and 1010 described above. In the embodiments depicted herein, the throat tap of the aspirator is coupled with a vacuum reservoir via a suction passage, and thus the source of the throat suction passage in these embodiments is the vacuum reservoir. However, the throat suction passage may have a different source, such as a fuel vapor purge system, crankcase, or other engine system or component, without departing from the scope of this disclosure. In the depicted embodiments, the pressure differential between the vacuum reservoir and the mixed flow outlet of the aspirator may factor into the determination of the flow level in the throat suction passage. For example, in the context of the engine systems depicted in FIGS. 3, 5, and 6, fluid flows into the throat tap via the throat suction passage when the pressure in the vacuum reservoir is higher than the pressure in the intake manifold (e.g., when a negative pressure or vacuum level in the vacuum reservoir is lower than a negative pressure or vacuum level in the intake manifold). At this time, suction flow also occurs via the diverging cone tap and the exit tube tap, with the exit tube tap providing a dominant flow. When the pressure in the intake manifold increases to a level higher than the pressure level in the vacuum reservoir (e.g., when vacuum in the vacuum reservoir is deeper than vacuum in the intake manifold), fluid may still flow from the vacuum reservoir into the throat tap of the aspirator via the throat suction passage and to the intake manifold. At this stage, the check valve in the exit tube suction passage closes, and the diverging cone tap dominates the suction flow into the aspirator. Upon further deepening of vacuum reservoir vacuum (e.g., when vacuum reservoir vacuum increases above a threshold/when vacuum reservoir pressure decreases below a threshold), the check valve in the suction passage coupled to the diverging cone closes, while suction flow into the throat tap continues. Accordingly, at this time, all evacuation of the vacuum reservoir is due to suction flow into the throat tap of the aspirator. Exemplary flow rates through the throat suction passage of the aspirator over a range of vacuum reservoir vacuums (in the context of the embodiments of FIGS. 3, 5, and 6) are depicted by characteristic 706 of FIG. 7 for an intake manifold vacuum level of 15 kPa. After 1012, method 1000 ends.

Returning to 1002, if the answer is NO indicating that flow through the aspirator is not desired, method 1000 proceeds to 1014. At 1014, method 1000 includes closing the ASOV. As discussed above, during conditions where relative pressures in the engine system are such that reverse flow through the aspirator (e.g., flow from the mixed outlet of the aspirator to the motive inlet of the aspirator) may occur, it may be desirable to close the ASOV. Alternatively, during high load/high speed conditions, flow through the aspirator may be undesirable as such diversion of flow may reduce the engine's ability to quickly ramp up to a requested load or speed, and thus the ASOV may be closed to prevent flow through the aspirator. After 1014, method 1000 ends.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. An engine system, comprising:
an aspirator with a suction tap in a throat of the aspirator, a suction tap in a diverging cone of the aspirator, and a suction tap in a straight tube downstream of the diverging cone, a motive inlet of the aspirator coupled with atmosphere and a mixed flow outlet of the aspirator coupled with a vacuum source, wherein the suction tap in the throat and the suction tap in the straight tube are coupled with a vacuum reservoir via respective parallel suction passages merging into a single passage downstream of the vacuum reservoir, wherein the suction tap in the diverging cone is coupled with a fuel vapor canister, and wherein a check valve is arranged in each passage.

2. The engine system of claim 1, wherein the mixed flow outlet of the aspirator is coupled with an intake passage of the engine upstream of a boost device and downstream of an air induction system throttle.

3. The engine system of claim 1, wherein the mixed flow outlet of the aspirator is coupled with an intake manifold of the engine.

4. The engine system of claim 3, wherein suction flow into each tap of the aspirator passes through only one check valve before entering the tap.

5. A method for an engine, comprising:
directing atmospheric air through an aspirator comprising a suction tap in a throat of the aspirator, a suction tap in a diverging cone of the aspirator, and a suction tap in a straight tube downstream of the diverging cone into an intake manifold of the engine based on pressure at a mixed flow outlet of the aspirator, the suction tap in the throat and the suction tap in the straight tube coupled with a vacuum reservoir via respective parallel suction passages merging into a single passage downstream of the vacuum reservoir, and the suction tap in the diverging cone coupled with a fuel vapor canister;
determining a flow level entering each suction tap of the aspirator;
determining a composition and amount of fluid exiting the mixed flow outlet of the aspirator based on the flow level entering each suction tube of the aspirator and an inference of fuel vapor concentration of fluid entering the suction tap in the diverging cone; and
compensating engine air-fuel ratio based on the composition and amount of fluid exiting the mixed flow outlet of the aspirator.

6. The method of claim 5, wherein directing atmospheric air through the aspirator comprises increasing opening of an aspirator shut off valve arranged in series with a motive inlet of the aspirator, the method further comprising determining a desired flow level through the aspirator and adjusting the aspirator shut off valve based on the desired flow level through the aspirator.

7. The method of claim 6, further comprising adjusting the aspirator shut off valve based on a pressure in the fuel vapor canister.

8. The method of claim 6, further comprising adjusting the aspirator shut off valve based on pressure in the intake manifold.

9. The method of claim 6, further comprising closing the aspirator shut off valve when intake manifold pressure exceeds atmospheric pressure.

10. The method of claim 5, wherein compensating engine air-fuel ratio based on the composition and amount of fluid exiting the mixed flow outlet of the aspirator comprises adjusting fuel injection based on a desired engine air-fuel ratio.

11. A method for an engine, comprising:
directing crankcase gases through an aspirator comprising a suction tap in a throat of the aspirator, a suction tap in a diverging cone of the aspirator, and a suction tap in a straight tube downstream of the diverging cone into an engine intake system when crankcase pressure exceeds a threshold,
wherein the crankcase gases are directed into an intake passage of the engine upstream of a boost device and downstream of an air induction system throttle, the method further comprising adjusting the air induction system throttle based on a desired level of flow through the aspirator.

12. The method of claim 11, wherein the crankcase gases are directed into an intake manifold of the engine.

13. The method of claim 12, wherein directing crankcase gases through the aspirator comprises increasing opening of an aspirator shut off valve arranged in series with a motive inlet of the aspirator, the method further comprising closing the aspirator shut off valve when intake manifold pressure exceeds crankcase pressure.

14. The engine system of claim 1, wherein the suction passage coupled to the suction tap in the throat is smaller than a suction passage coupled to the suction tap in the diverging cone, and wherein the suction passage coupled to the suction tap in the diverging cone is smaller than the suction passage coupled to the suction tap in the straight tube.

15. The method of claim 5, wherein the determination of the flow level entering each suction tap of the aspirator is based on barometric pressure, intake manifold pressure, aspirator shut off valve state, fuel vapor canister pressure, and vacuum reservoir pressure.

16. The method of claim 5, wherein directing atmospheric air through the aspirator comprises increasing opening of an aspirator shut off valve arranged in series with a motive inlet of the aspirator, the method further comprising determining a desired flow level through the aspirator based on engine operating conditions and adjusting the aspirator shut off valve based on the desired flow level through the aspirator.

17. The method of claim 6, wherein the determination of the desired flow level through the aspirator is based on barometric pressure, intake manifold pressure, a level of stored vacuum in the vacuum reservoir, and a pressure in the fuel vapor canister.

18. The method of claim 11, wherein adjusting the air induction system throttle based on the desired level of flow through the aspirator comprises increasing closing of the air induction system throttle to increase flow through the aspirator, and increasing opening of the air induction system throttle to decrease flow through the aspirator.

19. The method of claim 13, further comprising adjusting the air induction system throttle to regulate flow through the aspirator during a failure of the aspirator shut off valve.

* * * * *